(12) United States Patent
Arakawa et al.

(10) Patent No.: US 6,766,430 B2
(45) Date of Patent: *Jul. 20, 2004

(54) DATA REALLOCATION AMONG STORAGE SYSTEMS

(75) Inventors: Hiroshi Arakawa, Yokohama (JP); Kazuhiko Mogi, Yokohama (JP); Yoshiaki Eguchi, Machida (JP); Kouji Arai, Odawara (JP)

(73) Assignee: Hitachi, Ltd., Tokyo (JP)

( * ) Notice: Subject to any disclaimer, the term of this patent is extended or adjusted under 35 U.S.C. 154(b) by 452 days.

This patent is subject to a terminal disclaimer.

(21) Appl. No.: 09/835,073

(22) Filed: Apr. 12, 2001

(65) Prior Publication Data

US 2002/0004857 A1 Jan. 10, 2002

(30) Foreign Application Priority Data

Jul. 6, 2000 (JP) ........................................ 2000-205510

(51) Int. Cl.[7] .............................................. G06F 12/00
(52) U.S. Cl. ...................... 711/165; 711/114; 711/154; 711/161; 707/10; 707/204; 709/201; 709/231; 714/6
(58) Field of Search .................................. 711/165, 154, 711/114, 161; 707/10, 204, 205; 709/201, 231, 238, 213; 714/6

(56) References Cited

U.S. PATENT DOCUMENTS

| | | | | |
|---|---|---|---|---|
| 5,987,506 A | * | 11/1999 | Carter et al. | 709/213 |
| 6,199,146 B1 | * | 3/2001 | Pence | 711/154 |
| 6,389,432 B1 | * | 5/2002 | Pothapragada et al. | 707/205 |
| 6,598,174 B1 | * | 7/2003 | Parks et al. | 714/6 |

OTHER PUBLICATIONS

"Direct SAN File Access to Multiple Hosts in Windows® 2000 NTFS Environments," *VERITAS SANPoint*™ *Direct File Access* (Aug. 2000), Veritas Software Corporation, www.vertias.com, pp. 1–10.
Marc Farley, *Building Storage Networks*, McGraw–Hill, Berkeley, 2000, Chap. 13, "Installable File Systems," pp. 470–481.
Tivoli, "Tivoli SANergy? The Power to Share," *Tivoli(R) SANergy*[™] (Feb. 21, 2001), www.tivoli.com/products/index/sanergy/, two pages.
Tivoli, "Technical Highlights," *Tivoli(R) SANergy*[™] (Feb. 21, 2001), www.tivoli.com/products/index/sanergy/sanergy_tech.html, two pages.
Tivoli, "Product Features and Benefits," *Tivoli(R) SANergy* [™] (Feb. 21, 2001), www.tivoli.com/pro . . . ocuments/updates/sanergy_features.html, three pages.

\* cited by examiner

*Primary Examiner*—Mano Padmanabhan
*Assistant Examiner*—Mehdi Namazi
(74) *Attorney, Agent, or Firm*—Townsend Townsend and Crew LLP

(57) ABSTRACT

The present invention provides techniques, including a method and system, for relocating data between storage systems. In one embodiment of the present invention a host collects usage information from a plurality of storage systems, and determines the relocation destination LU for data stored in the LU to be relocated. The host alters an LU logical position name table that determines matching between the logical position names of data and LUs. It also carries out data relocation between storage subsystems by shifting data stored in an origin LU to be relocated to a destination LU. In another embodiment relocation of files is provided.

42 Claims, 32 Drawing Sheets

FIG.3

| LOGICAL ADDRESS 5010 | | | | 5005 | PHYSICAL ADDRESS | | | |
|---|---|---|---|---|---|---|---|---|
| 5001 | 5002 | 5003 | 5004 | | 5006 DATA 5022 | | 5006 PARITY 5024 | |
| LU NO. | INTRA-LU ADDRESS | LOGICAL VOLUME NO. | LOGICAL VOLUME ADDRESS | PARITY GROUP NO. | DISK UNIT NO. | 5007 INTRA-DISK UNIT ADDRESS | DISK UNIT NO. | 5007 INTRA-DISK UNIT ADDRESS |
| 0 | 0 ~ 999 | 0 | 0 ~ 999 | 100 | 0 | 0 ~ 999 | 2 | 0 ~ 999 |
| 0 | 1000 ~ 1999 | 0 | 1000 ~ 1999 | 100 | 1 | 0 ~ 999 | 2 | 0 ~ 999 |
| 0 | 2000 ~ 2999 | 1 | 0 ~ 999 | 100 | 0 | 1000 ~ 1999 | 2 | 1000 ~ 1999 |
| 0 | 3000 ~ 3999 | 1 | 1000 ~ 1999 | 100 | 1 | 1000 ~ 1999 | 2 | 1000 ~ 1999 |
| 0 | 4000 ~ 4999 | 2 | 0 ~ 999 | 101 | 3 | 0 ~ 999 | 4 | 0 ~ 999 |
| 1 | 0 ~ 999 | 3 | 0 ~ 999 | 100 | 5 | 0 ~ 999 | 6 | 0 ~ 999 |
| 2 | 1000 ~ 1999 | 4 | 0 ~ 999 | COMMAND VOLUME | | | | |

| LOGICAL VOLUME NO. | DURATION OF PARITY GROUP OCCUPATION BY RANDOM READ PROCESSING (IN MICROSECONDS) | DURATION OF PARITY GROUP OCCUPATION BY RANDOM WRITE (DATA) PROCESSING (IN MICROSECONDS) | DURATION OF PARITY GROUP OCCUPATION BY RANDOM WRITE (PARITY) PROCESSING (IN MICROSECONDS) | DURATION OF PARITY GROUP OCCUPATION BY SEQUENTIAL READ PROCESSING (IN MICROSECONDS) | DURATION OF PARITY GROUP OCCUPATION BY SEQUENTIAL WRITE (DATA) PROCESSING (IN MICROSECONDS) | DURATION OF PARITY GROUP OCCUPATION BY SEQUENTIAL WRITE (PARITY) PROCESSING (IN MICROSECONDS) |
|---|---|---|---|---|---|---|
| 0 | 3141 | 101 | 121 | 59265 | 0 | 0 |
| 1 | 0 | 131 | 111 | 0 | 24360 | 17320 |
| | | | | | | |

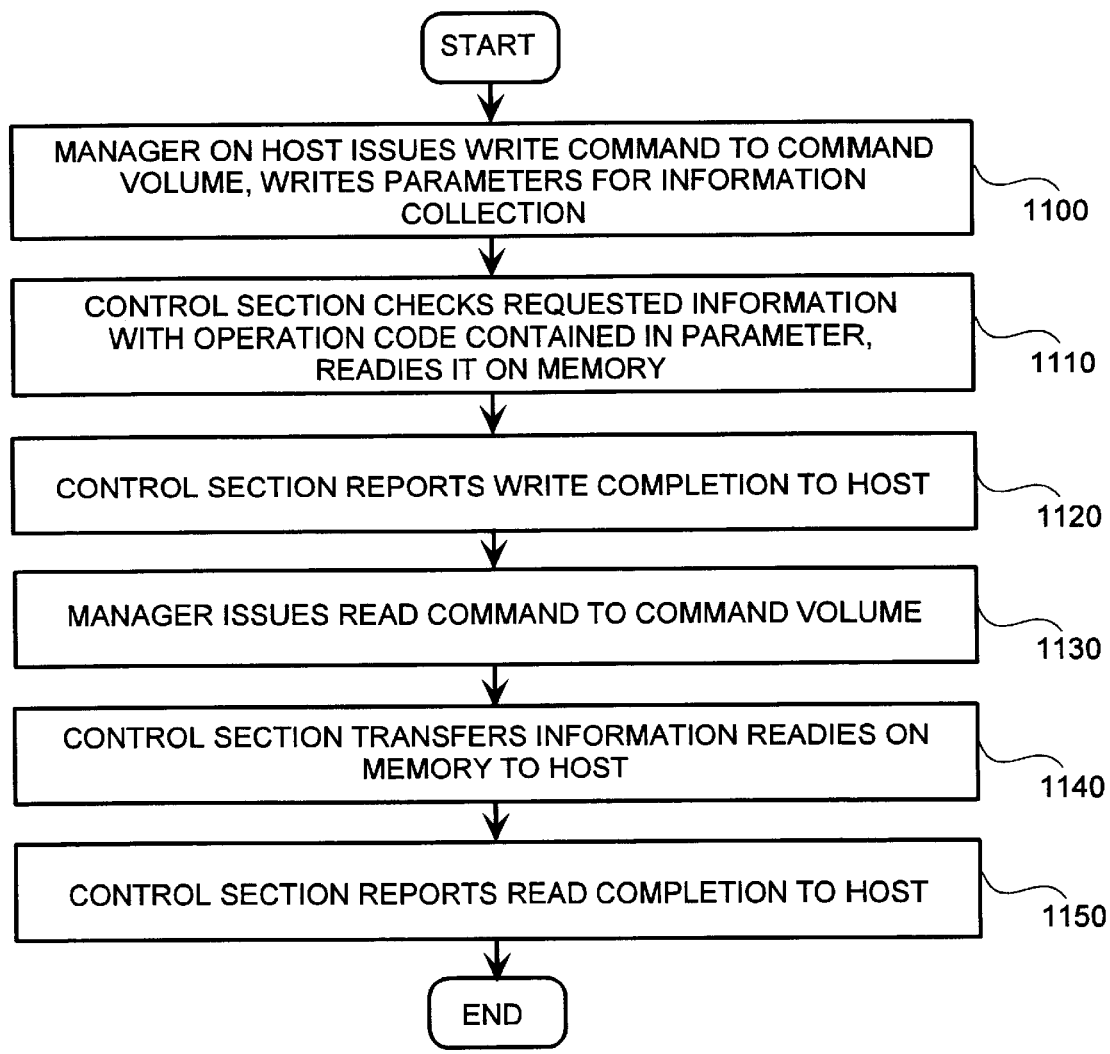

| BYTES | CONTENTS |
|---|---|
| 0 – 1 | LOGIC VOLUME NO. |
| 2 – 4 | Reserved |
| 5 | 0xB6 : OPERATION CODE (LOGIC VOLUME INFORMATION ACQUIRED) |
| 6 – 7 | Reserved |
| 8 – 511 | Don't care |

FIG.7

| BYTES | CONTENTS |
|---|---|
| 0 — 1 | LOGIC VOLUME NO. (5201) |
| 2 — 4 | Don't care |
| 5 | 0xB6 : OPERATION CODE (LOGIC VOLUME INFORMATION ACQUIRED) |
| 6 — 7 | Don't care |
| 8 — 11 | DISK ARRAY MANUFACTURE NO. (5202) |
| 12 — 43 | VOLUME TYPE IN WHICH DISK ARRAY PERFORMS EMULATION VIS-A-VIS HOST (VOLUME EMULATION TYPE) (EXPRESSED IN CODE) |
| 44 — 47 | VOLUME CAPACITY (IN MB) |
| 48 | FLAG SHOWING WHETHER VOLUME CAN BE DESTINATION OF COPYING |
| 49 | NUMBER OF LOGIC VOLUMES CONSTITUTING THE LU (5203) |
| 51 — 121 | LOGIC VOLUME NOS. CONSTITUTING THE LU (FOR EVERY TWO BYTES) |
| 122 — 511 | Reserved |

FIG.9

| BYTES | CONTENTS |
|---|---|
| 0 — 1 | LOGIC VOLUME NO. (5201) |
| 2 — 3 | PARITY GROUP NO. (5204) |
| 4 | Reserved |
| 5 | 0xB7 : OPERATION CODE (LOGIC VOLUME INFORMATION ACQUIRED) |
| 6 — 7 | Reserved |
| 8 — 11 | DISK ARRAY MANUFACTURE NO. |
| 12 — 15 | USER CAPACITY OF THE PARITY GROUP (IN MB) |
| 16 — 17 | Reserved |
| 18 | NO. OF CONTROLLER CONTROLLING THE PARITY GROUP (FIRST) |
| 19 | NO. OF CONTROLLER CONTROLLING THE PARITY GROUP (SECOND) |
| 20 — 23 | TYPE DENOMINATION OF DISK UNITS CONSTITUTING THE PARITY GROUP |
| 24 — 27 | CAPACITIES OF DISK UNITS (IN MB) |
| 28 | RAID LEVELS OF THE PARITY GROUP (0x01: RAID1, 0x05: RAID5) |
| 29 | RAID CONFIGURATION OF THE PARITY GROUP (0x01: 1D+12, 0x02: 2D+2P, 0x03: 3D+1P, 0x06: 6D+1P) |
| 30 — 31 | NUMBER OF LOGIC VOLUMES ALLOCATED TO THE PARITY GROUP (5205) |
| 32 — 287 | LOGIC VOLUME NOS. ALLOCATED TO THE PARITY GROUP (FOR EVERY TWO BYTES) (5206) |
| 288 — 511 | Reserved |

FIG.10

| BYTES | CONTENTS |
|---|---|
| 0 — 1 | LOGIC VOLUME NO. |
| 2 — 4 | Reserved |
| 5 | 0xB5 : OPERATION CODE (USAGE INFORMATION ACQUIRED) |
| 6 — 7 | Reserved |
| 8 — 511 | Don't care |

| BYTES | CONTENTS | |
|---|---|---|
| | MAIN FRAME VOLUME | OPEN SYSTEM VOLUME |
| 0 - 1 | LOGIC VOLUME NO. | |
| 2 - 4 | Reserved | |
| 5 | 0x5B: OPERATION CODE (USAGE INFORMATION ACQUIRED) | |
| 6 - 7 | Reserved | |
| 8 - 11 | DISK ARRAY MANUFACTURE NO. | |
| 12 - 43 | VOLUME EMULATION TYPE (EXPRESSED IN ASCII CHARACTER STRING) | |
| 44 - 47 | Don't care | |
| 48 - 51 | Search/read I/O count in basic mode | RANDOM READ I/O COUNT |
| 52 - 55 | Search/read hit I/O count in basic mode | RANDOM READ BIT I/O COUNT |
| 56 - 59 | Write I/O count in basic mode | RANDOM WRITE I/O COUNT |
| 60 - 63 | DFO write hit I/O count | RANDOM WRITE BIT I/O COUNT |
| 64 - 67 | Search/read I/O count in sequential access mode | SEQUENTIAL READ I/O COUNT |
| 68 - 71 | Search/read hit I/O count in sequential access mode | SEQUENTIAL READ BIT I/O COUNT |
| 72 - 75 | Write I/O count in sequential access mode | SEQUENTIAL WRITE I/O COUNT |
| 76 - 79 | OFW write hit I/O count in DFW sequential access mode | SEQUENTIAL WRITE BIT I/O COUNT |
| 80 - 83 | CFW search/read count | Don't care |
| 84 - 87 | CFW search/read hit count | Don't care |
| 88 - 87 | CFW write I/O count | Don't care |
| 88 - 91 | CFW write hit count | Don't care |
| 92 - 95 | I/O count in cache load inhibit mode | Don't care |
| 96 - 99 | I/O count in bypass cache mode | Don't care |
| 100 - 103 | Number of tracks loaded in sequential access mode | |
| 108 - 111 | Number of tracks loaded in modes other than sequential access mode | |
| 112 - 115 | Number of tracks the data of which is transfer from cache to drive | |
| 116 - 119 | DFW count | Don't care |
| 120 - 123 | DFW normal count | Don't care |
| 124 - 127 | DFW sequential access count | Don't care |
| 128 - 130 | Reserved | |
| 131 - 135 | CURRENT TIME | |
| 136 - 139 | DURATION OF PARITY GROUP OCCUPATION BY RANDOM READ PROCESSING (IN MICROSECONDS) | |
| 140 - 143 | DURATION OF PARITY GROUP OCCUPATION BY RANDOM WRITE (DATA) PROCESSING (IN MICROSECONDS) | |
| 144 - 147 | DURATION OF PARITY GROUP OCCUPATION BY RANDOM WRITE (PARITY) PROCESSING (IN MICROSECONDS) | |
| 148 - 151 | DURATION OF PARITY GROUP OCCUPATION BY SEQUENTIAL READ PROCESSING (IN MICROSECONDS) | |
| 152 - 155 | DURATION OF PARITY GROUP OCCUPATION BY SEQUENTIAL WRITE (DATA) PROCESSING (IN MICROSECONDS) | |
| 156 - 159 | DURATION OF PARITY GROUP OCCUPATION BY SEQUENTIAL WRITE (PARITY) PROCESSING (IN MICROSECONDS) | |
| 160 - 415 | DURATION OF PROCESSOR OCCUPATION (FOR EVERY FOUR BYTES) (IN MICROSECONDS) | |
| 416 - 543 | DURATION OF PARITY GENERATING CIRCUIT OCCUPATION (FOR EVERY FOUR BYTES) (IN MICROSECONDS) | |
| 544 - 991 | DURATION OF BUS OCCUPATION (FOR EVERY FOUR BYTES) (IN MICROSECONDS) | |
| 992 - 999 | QUANTITY OF WRITE PENDING IN CACHE (QUANTITY OF DIRTY DATA EXISTING ON CACHE 330 BUT NOT YET REFRECTED IN DISK UNIT 210) (IN MICROSECONDS) | |
| 1000 - 1023 | Reserved | |

FIG.14

| LU NO. | | | LOGICAL POSITION NAME (DIRECTORY) |
|---|---|---|---|
| DISK ARRAY NO. | ID | LUN | |
| 0 | 2 | 3 | ··· /home 1 / pr jct 1 |
| 1 | 4 | 5 | ··· /temp |
| 1 | 5 | 2 | NOT USED (UNOCCUPIED) |
| | | | |

FIG.15

| LU NO. | | | LOGICAL POSITION NAME (DRIVE) |
|---|---|---|---|
| DISK ARRAY NO. | ID | LUN | |
| 0 | 2 | 3 | X: |
| 1 | 4 | 5 | Y: |
| 1 | 5 | 2 | NOT USED (UNOCCUPIED) |
| | | | |

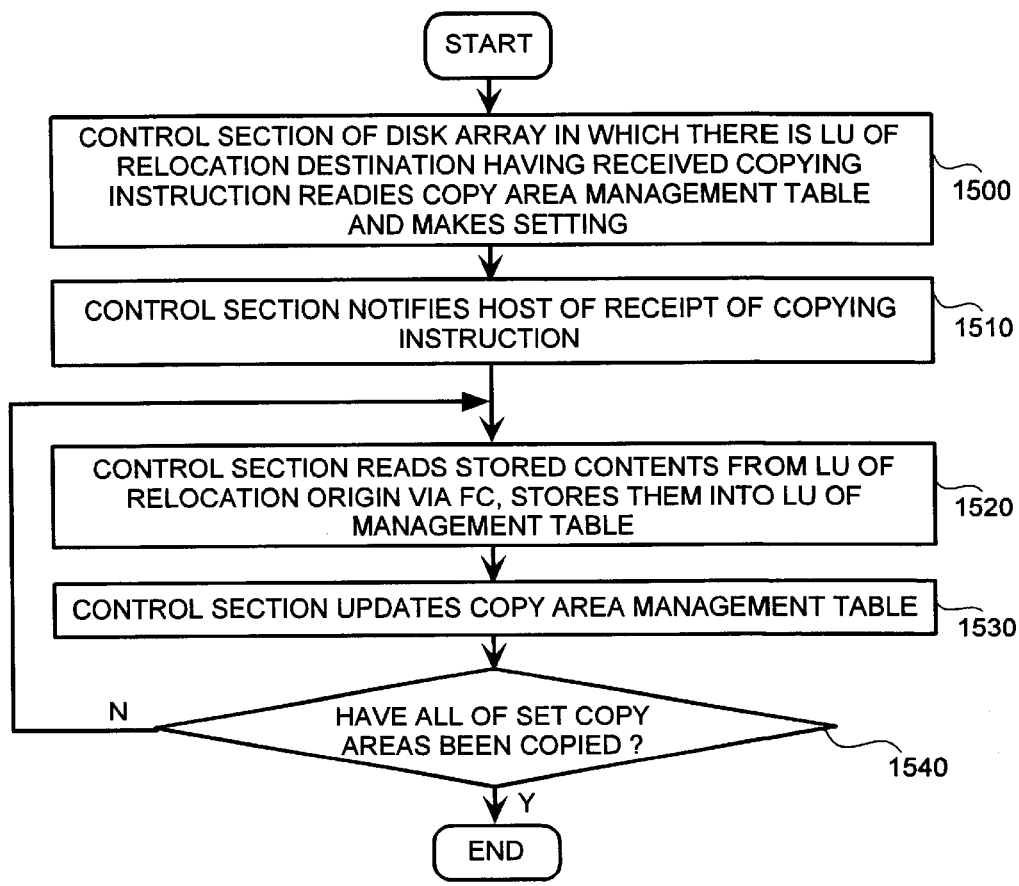

FIG.22

| DATA OF PREPARATION 6401 | DATA OF UPDATING 6402 | DATA OF ACCESS 6403 | ATTRIBUTE 6404 | LOGICAL POSITION NAME OF FILE 6405 | SECURITY INFORMATION 6406 | FILE POSITION 6407 |
|---|---|---|---|---|---|---|
| Jan 7, 2000 19:30 | Jan 7, 2000 19:40 | Jan 7, 2000 19:50 | NORMAL | .../prjct 1 /doc1.txt | ONLY OWNER MAY READ/WRITE | 100-150 |
| Jan 9, 2000 8:30 | Jan 9, 2000 8:40 | Jan 9, 2000 13:50 | SYSTEM FILE | .../prjct 3 /voice1.mid | ONLY GROUP MAY READ/WRITE | 300-400 |
| (Date of Reservation) 6420 | | | Reserved 6422 | | | 1000-1500 6424 |

| LU NO. | SIZE | CONFIGU-RATION | STATE | DISK ARRAY NO. | PATH | ID | LUN | DISK PERFOR-MANCE | EMULATION TYPE | RELOCAT-ABILITY FLAG |
|---|---|---|---|---|---|---|---|---|---|---|
| 0 | 1000 | RAID1 | ON LINE | 0 | 0 | 0 | 0 | MEDIUM | Open3 | OFF |
| 1 | 1000 | RAID2 | OFF LINE | 0 | - | - | - | HIGH | Open3 | ON |
| 2 | 3500 | CACHE | ON LINE | 0 | 0 | 0 | 1 | ULTRA-HIGH | Open3 | OFF |
| 2 | 3500 | CACHE | ON LINE | 0 | 1 | 0 | 0 | ULTRA-HIGH | Open3 | OFF |
| ... | | | | | | | | | | |
| k | - | - | UNMOUNT-ED | - | - | - | - | - | - | - |
| k+1 | 1000 | UNIT DISK | IN TROUBLE | 0 | 0 | 1 | 0 | LOW | 3390-3 | OFF |
| k+2 | 1000 | RAID1 | OFF LINE | 0 | - | - | - | HIGH | 3390-3 | ON |
| ... | | | | | | | | | | |
| n | - | - | UNMOUNT-ED | - | - | - | - | - | - | - |

3310 3320 3330 3340 3350 3360 3370 3380 3390 3400 3410

3510

| TYPE OF USE | INTRA-AREA ADDRESS | LU NO. | | INTRA-LU ADDRESS |
| --- | --- | --- | --- | --- |
| | | DISK ARRAY NO. | ID | LUN | |

| TYPE OF USE | INTRA-AREA ADDRESS | DISK ARRAY NO. | ID | LUN | INTRA-LU ADDRESS |
| --- | --- | --- | --- | --- | --- |
| FILE SHARING THROUGH DATA TRANSFER VIA FC | 0 ~ 999 | 0 | 2 | 3 | 0 ~ 999 |
| | 1000 ~ 2999 | 1 | 4 | 5 | 0 ~ 999 |
| | 3000 ~ 3999 | 1 | 5 | 2 | 0 ~ 999 |
| | | | | | |
| FILE SHARING THROUGH DATA TRANSFER VIA NETWORK | 0 ~ 999 | 0 | 2 | 4 | 0 ~ 999 |
| | 1000 ~ 2999 | 1 | 4 | 6 | 0 ~ 999 |
| | | | | | |
| LU SHARING THROUGH DATA TRANSFER VIA FC | 0 ~ 999 | 1 | 1 | 1 | 0 ~ 999 |
| | | | | | |
| LU SHARING THROUGH DATA TRANSFER VIA NETWORK | 0 ~ 999 | 1 | 2 | 2 | 0 ~ 999 |
| | | | | | |
| UNUSED AREA | - | 0 | 0 | 0 | 0 ~ 999 |
| | - | 0 | 0 | 1 | 0 ~ 999 |
| | | | | | |

DATA REALLOCATION AMONG STORAGE SYSTEMS

CROSS-REFERENCES TO RELATED APPLICATIONS

This application is related to and claims priority from Japanese Patent Application No. 2000-205510, filed on Jul. 6, 2000.

BACKGROUND OF THE INVENTION

The present invention relates generally to managing data stored in a storage system, and more particularly to relocating data in a computer system having a plurality of storage systems.

One conventional technique for relocation of data stored in a storage system such as a disk array system is described in JP-A-No. Hei 9-274544. The disk array system in this application refers to a system, in which a plurality of disk units are arranged in arrays, for accomplishing the reading/writing of data. The data is divided and stored among the individual disk units and read/written at high speed by operating the disk units in parallel. As described in D. A. Patterson, G. Gibson and R. H. Kats, "A Case for Redundant Arrays of Inexpensive Disks (RAID)," Proc. ACM SIGMOD, pp. 109–116, June 1988, different levels consisting of level 1 through level 5 are given, depending on the redundancy configuration of the disk array systems. In addition to these redundancy levels, a disk array system without redundancy may be referred to as level 0.

Since disk array systems of different levels differ in cost, performance and characteristics, arrays (each being a group of disk units) of a plurality of levels are often mixed in architecting a disk array system. An array of each level in such a case is referred to as a parity group. As the disk units also differ in cost with performance, capacity and other factors, a plurality of types of disk units, differing in performance and capacity, may also be used in architecting a disk array system with a view to achieving the optimal cost performance.

Furthermore, in such a disk array system, since data may be distributed among a plurality of disk units, each logical storage area to be accessed by a host computer connected to the disk array system is matched with a physical storage area of a disk unit (address conversion). In such a disk array system, according to JP-A-No. Hei 9-274544, for a logical storage area, data may be relocated from one physical storage area to another physical storage area without changing the logical storage area address. Further, the load state due to accessing by the host computer to the different logical storage areas are managed, and the particulars of a relocation are determined so that the data be appropriately arranged after the relocation.

There are also techniques for transferring data between a host computer and storage systems such as that disclosed in M. T. O'Keefe, "Shared File Systems and Fibre Channel," Proc. Sixth Goddard Conference on Mass Storage Systems and Technologies, pp. 1–16, March 1998. According to this technique, there is disclosed a SAN (Storage Area Network), i.e. a storage environment in which a plurality of host computers and a plurality of storage systems are connected by Fibre channels (FCs), in which high-speed interfaces, realize data sharing via the FCs. By transferring data via FCs in this way, loads on the host computers and the network can be reduced compared with usual transfers via a network.

A conventional technique for enabling a plurality of computers to share data in files held by storage systems connected to typical networks not using high-speed FCs, is an NFS (Network File System). When data is shared using an NFS, loads on the computer sharing data or on the network connecting the computers and storage systems are greater than in the aforementioned case of using FCs. However, since existing networks can be used, it has its own advantages in that the cost of new equipment can be smaller than where a FC network is to be newly laid and the management of file sharing and other factors can be easier.

As stated above, the technique described in JP-A-No. Hei 9-274544 makes possible relocation of data within a disk array system. However, it does not cover relocation of data between storage systems in computer system having a plurality of storage systems. In addition, since a disk array system is incapable of file recognition, the technique does not allow relocation of files.

On the other hand, a SAN (Storage Area Network) makes possible high-speed data transfers between storage systems using a FC switch. However, relocation of data by transferring data between storage systems by using a SAN entails the following problems.

In the prior art for a SAN, no consideration is given to the acquisition by the host computer, which is to control relocation of data, of necessary information for determining appropriate arrangement of data, such as the state of load on each storage area in each storage system due to accessing by the host computer. As a result neither the host computer nor its user can judge how data should be relocated to realize efficient arrangement of the data.

Furthermore, even if the user tried to relocate data in each storage system himself/herself, the burden on the user would be great because the user would have to check in detail and take charge of everything including the management of unused areas in the destination of data relocation.

Moreover, if data is transferred between storage systems, the data seen by an application, i.e., the destination address to be designated by the application to access the same data, will differ between before and after the relocation.

Also, data sharing on a typical network using an NFS involves the following problems.

In the prior art, when a host computer used for data sharing in an NFS network (hereinafter to be referred to as an "NFS server"), manages a plurality of storage systems, the NFS server itself cannot physically relocate data between the plurality of storage systems. As a consequence, it is very difficult to accomplish, by using an NFS server, fine differentiation and management of the storage areas in the storage systems, such as altering the physical positions of shared data for each computer.

Thus there is a need for a host computer, including an NFS server, to acquire from the storage systems, for example disk arrays, necessary information for appropriate arrangement of data and thereby alleviate the burden on the user of managing the data on the storage systems. There is also a need for relocation of data between different storage systems to be transparent to an application, i.e., the data location seen by an application is the same before and after the relocation. Lastly, there is a need for the relocation of data as files.

SUMMARY OF THE INVENTION

The present invention provides techniques, including a method and system, for relocating data between storage systems. Examples of storage systems include a client's PC hard disk, a server's hard disks or databases, or a disk array.

In one embodiment of the present invention a disk array acquires usage of a disk unit in response to read/write from a host. The host collects usage from a plurality of disk arrays, and determines the relocation destination LU for data stored in the LU to be relocated, and alters an LU logical position name table that determines matching between the logical position names of data, which are the data positions for an application, and LUs. It also carries out data relocation between different disk arrays by shifting data stored in the LU to be relocated to the relocation destination LU.

In a first embodiment of the present invention, a computer is provided with a requesting means for requesting at least one storage system connected to the computer to notify the usage of the physical storage system resources of each logical storage area of the storage system. Further, the storage system is provided with an acquisition means for acquiring usage of physical storage system resources of each storage area of the storage system, and a notifying unit for notifying the computer, at a request from the computer, the usage of the physical storage system resources of each logical storage area of the storage system acquired by the acquisition means.

The usage of the physical storage system resources of each storage area includes, for instance, the usage of the physical storage space of the storage area and the usage of the processing time of the storage system spent in the processing of access to the storage space.

In this embodiment, the computer can use the information on usage of the physical storage system resources of each logical storage area of the storage system acquired from the storage system for, e.g., determining the particulars of appropriate arrangement of data from the viewpoint of load diffusion of storage system resources. Therefore, by using this information, the data can be appropriately arranged by, for instance, relocating the data among different storage systems.

In a second embodiment of the invention, a computer is provided with a control means for controlling physical relocation of data among the logical storage areas of the at least one storage system connected to the computer; a matching table for defining matching between a logical position indicating the logical position of data perceived by an application operating on the computer and a logical storage area of the storage system storing the data; and an updating unit for updating the matching table so that the logical storage area of the storage system, which is the relocation destination of data relocated by the control means, match the logical position of the data.

In this embodiment, even if, between before and after the relocation of data, the storage system or storage area storing the data varies, the logical position of the data does not vary. Thus, data can be relocated without allowing the logical position to vary between before and after the relocation of the data for an application accessing data according to its logical position.

In a third embodiment of the invention, a computer is provided with a managing means for managing a matching between a file and a logical storage area of the storage system connected to the computer in which the file is stored; and an extracting unit for extracting the usage of the physical storage system resources of the logical storage area in which each file is stored.

In this third embodiment, it is possible to obtain on the computer side the usage of the physical storage system resources of the storage area, in which a file is stored, and to determine the particulars of the relocation of the file. This enables files to be efficiently arranged.

These and other embodiments of the present invention are described in more detail in conjunction with the text below and attached figures.

BRIEF DESCRIPTION OF THE DRAWINGS

FIG. 3 is a table of items of logical/physical matching information used in the first embodiment of the invention.

FIG. 4 is a table of items of logical volume usage in the first embodiment of the invention.

FIG. 5 is a flow chart showing the procedure of usage collection processing in the first embodiment of the invention.

FIG. 7 is a further list of parameters of logical volume information for use in the first embodiment of the invention.

FIG. 9 is a further list of parameters of parity group information for use in the first embodiment of the invention.

FIG. 10 is a list of parameters of usage information for use in the first embodiment of the invention.

FIG. 11 is a further list of parameters of usage information for use in the first embodiment of the invention.

FIG. 14 shows an LU logical position name table for use in the first embodiment of the invention.

FIG. 15 shows another LU logical position name table for use in the first embodiment of the invention.

FIG. 16 is a flow chart showing the procedure of copy processing in the first embodiment of the invention.

FIG. 17 shows a copy area management table for use in the first embodiment of the invention.

FIG. 22 shows metadata for use in the second embodiment of the invention.

FIG. 29 shows an LU management table in the fourth embodiment of the invention.

DESCRIPTION OF THE SPECIFIC EMBODIMENTS

First will be described a first embodiment of the invention.

Figure 1:
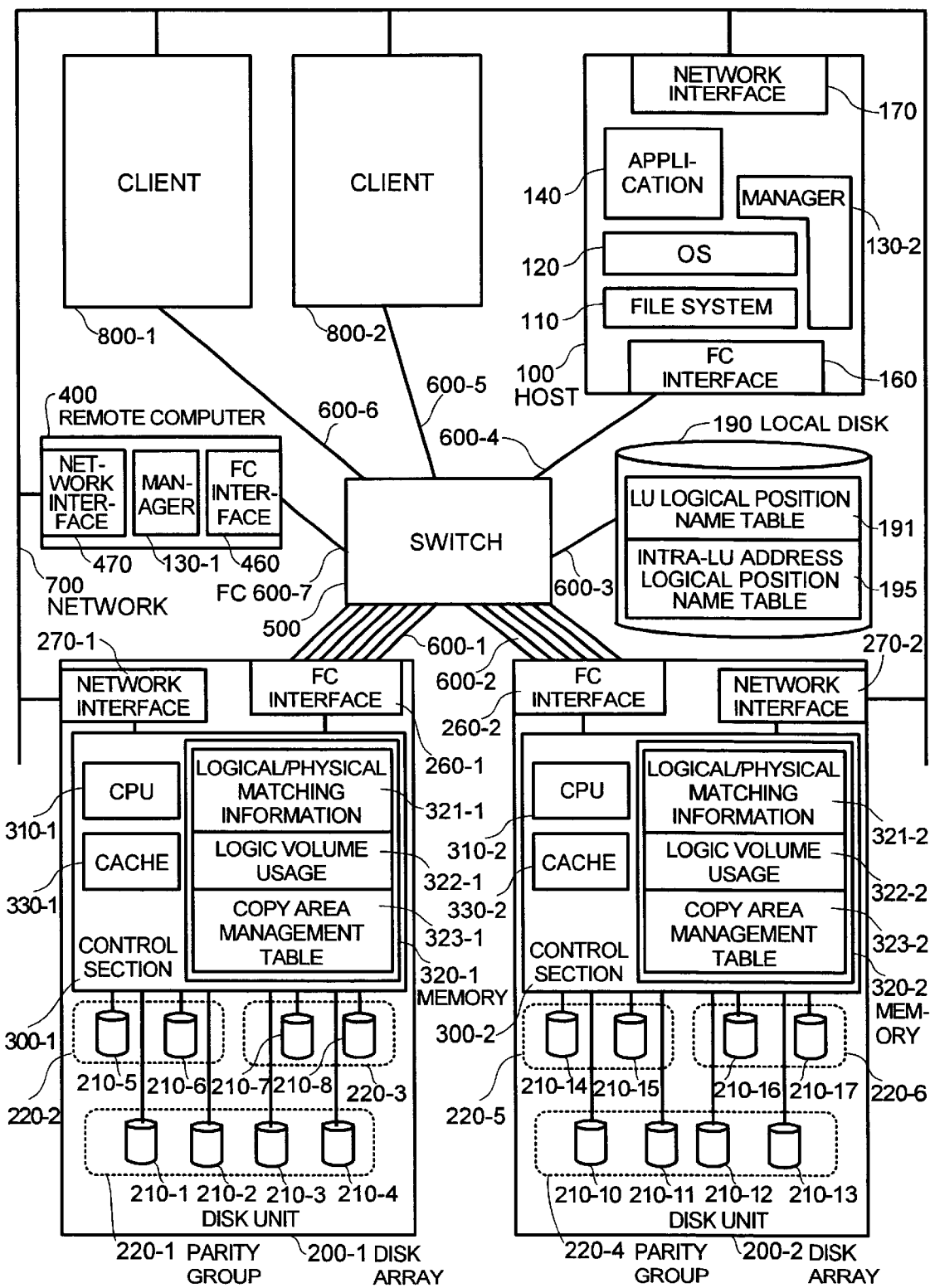
FIG. 1 is a diagram illustrating the configuration of a computer system of a first embodiment of the present invention.

FIG. 1 illustrates the configuration of a computer system for a first embodiment of the present invention.

As illustrated, a computer system in this embodiment comprises a host 100, disk arrays 200-1 and 200-2, a switch 500, clients 800-1 and 800-2 and a local disk 190.

The host 100 has a network interface 170 and a FC (Fibre Channel) interface 160. The network interface 170 is connected via a network 700 to the clients 800-1 and 800-2 and the disk arrays 200-1 and 200-2. The FC interface 160 is connected to the switch 500, the disk arrays 200-1/2 and the local disk 190 via FCs 600-1 to 600-4. Also, the host 100 has a file system 110, an OS 120, a manager 130 and an application 140. The application 140 reads from and writes into the disk arrays 200-1/2 via the OS 120 and the file system 110.

The host 100 and the clients 800-1/2 can be implemented on an electronic computer with a typical configuration, provided with, for instance, a CPU, a main storage, an external storage system(s), an input device, a display device and so forth. In this case, each section shown in FIG. 1 is realized as a process embodied on the electronic computer as the CPU executes a program loaded on the main storage. The program for implementing these sections on the electronic computer illustrated in FIG. 1 is stored in advance in an external storage system and loaded onto the main storage as required for execution by the CPU. Alternatively, the program may be stored on a portable storage medium, for instance a CD-ROM or a DVD-ROM, and after being transferred from the portable storage medium into the external storage system via a reading device, loaded onto the main storage as required for execution by the CPU. Or else, it may be received as appropriate via a communication medium, such as the network 700 and, after being stored into the external storage system, loaded onto the main storage as required for execution by the CPU.

In the local disk 190 is stored various items of management information including an LU (logical unit) logical position name table 191 and an intra-LU address logical position name table 195 to be used by the OS 120 and the file system 110. The LU logical position name table 191 is a table that shows the matching or mapping between a logical position name the application 140 designates when accessing data in a disk array system 200-1 or 200-2 and a LU (which will be elaborated upon later) for storing the set of data specified by the logical position name.

The intra-LU address logical position name table 195 is a table that shows the matching or mapping between a logical position name the application 140 designates when accessing data in a disk array system and the intra-LU address of the set of data specified by the logical position name.

For example the disk array 200-1 has a control section 300-1, a plurality of disk units 210-1 to 210-8, a network interface 270-1 and an FC interface 260-1. The network interface 270-1 is connected via the network 700 to the clients 800-1 and 800-2, and the host 100. The FC interface 260-1 is connected via the switch 500 and FCs 600-1, 600-3 and 600-4 to the host 100 and the local disk 190.

The control section 300-1 has a CPU 310-1 for the execution of processing, a memory 320-1 and a cache 330-1. Into the memory 320-1 are stored logical/physical matching information 321-1, a logical volume usage 322-1 and a copy area management table 323-1. Details of these information items will be described later.

There are n (n is 2 or a larger integer) disk units 210, e.g., 210-1, 210-2, 210-3, and 210-4, to constitute a RAID (disk array), and this set of n disk units, generically referred to as 210, is referred to as a parity group, generically referred to as 220, (for example disk units 210-1, 210-2, 210-3, and 210-4 constitute parity group 220-1). Note, in this description, for ease of documentation, a label with a dashed extension number refers to a specific item in the figures (e.g., 210-1 or 210-2), while a number without a dashed extension (e.g., 210) refers generically to the item and includes one or more of the dashed extensions (e.g. the label "disk units 210" includes 210-1 and/or 210-2). Possible configurations of a RAID include redundancy-involving ones such as a configuration in which redundant data (parity) generated from the contents stored in n-1 disk units, out of the disk units 210 contained in one parity group 220, are stored into the remaining one disk unit, or a mirror disk (RAID 1) configuration in which contents stored in n/2 disk units are kept in a copied form by the remaining n/2 disk units. Each parity group 220 can be deemed to be one operational unit.

Incidentally, because the cost, performance, characteristics and other factors differ with the level of redundancy, the magnitude of n (the number of disk units) and the like, arrays (parity groups 220) differing in level and n may be mixed in configuring disk arrays, for example, 200-1 and 200-2. Regarding disk units 210 constituting the parity groups 220 as well, because of the difference in cost with performance, capacity and other factors, a plurality of types of disk units 210 differing in performance and capacity may be used to realize the optimal cost performance in configuring disk arrays 200. In this embodiment, too, the attributes of different parity groups 220 constituting disk arrays 200 including performance, reliability and characteristics may be either the same or different.

Since the disk arrays 200 store data in the disk units 210 in a distributive way, a logical volume to be read from or written to by the host 100 is matched with physical addresses representing storage areas in the disk units 210 (address conversion), and the host 100 is thereby provided with the logical volume. Further, the disk arrays 200, in converting addresses, can as well combine a plurality of logical volumes and provide them to the host 100 as a single logical unit (LU). Thus the disk arrays 200 provide to the host 100 an LU consisting of at least one logical volume. Then the host 100 reads from and writes into the LU.

In the above-described configuration in this embodiment, physical relocation of data, taking into account the usage of the disk arrays 200, is made possible between the plurality of disk arrays 200, for example, physical relocation of data between disk array 200-1 and disk array 200-2. More specifically, the disk arrays 200 acquire the usage of the disk units 210 in terms of reading/writing by the host 100. The host 100 collects the usage acquired by each of the plurality of disk arrays 200 as described above, and displays it to the user. Further, the host 100, in response to an instruction from the user to whom the usage of the plurality of disk arrays 200 has been presented in the above-described manner, alters the LU logical position name table 191 in the local disk 190, and copies data stored by the disk arrays 200 in the LU, for example from disk array 200-1 to 200-2. LU relocation between the plurality of disk arrays 200 is accomplished in this manner. By making possible such data relocation taking account of the usage of the disk arrays 200, appropriate arrangement of data is also made possible.

The actions of the computer system in this first embodiment will be described in detail below.

First will be described the read/write processing by the disk arrays 200 in accordance with a read/write request from the host 100 and usage acquisition processing by which the disk arrays 200 acquire the usage of the disk units 210.

Figure 2:
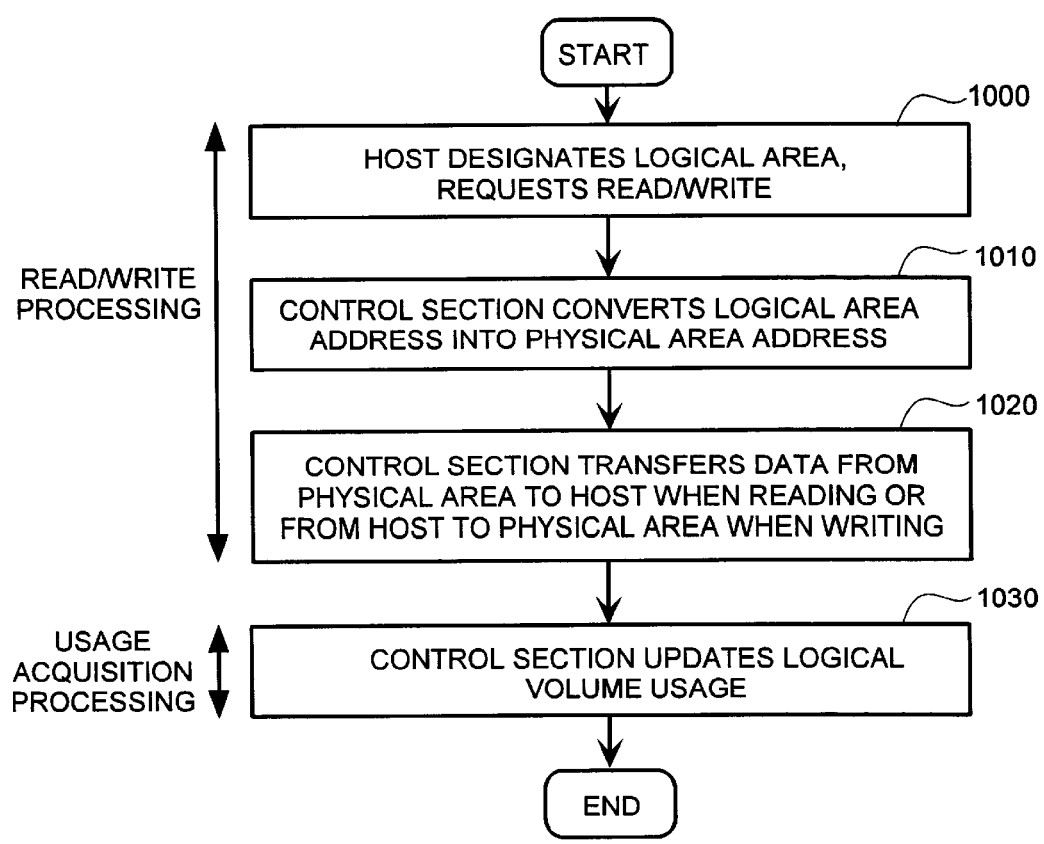
FIG. 2 is a flow chart showing the procedure of read/write processing and usage acquisition processing in the first embodiment of the invention.

FIG. 2 illustrates the sequence of this processing of an embodiment of the present invention.

First, in the host 100, as the application 140 designates a file by a specific file logical position name and requests the OS 120 to read from or write into the file, the OS 120 requests the file system 110 to read from or write into the file. In response, the file system 110 accesses the local disk 190 via the FC interface 160 to obtain from the LU logical position name table 191 the LU number in which the designated file is stored, and obtains from the intra-LU address logical position name table 195, among other items, the intra-LU address at which the designated file is stored. Then, it issues a read command or a write command of the SCSI (Small Computer System Interface) standard, accompanied with the LU number and the intra-LU address to the disk arrays 200 providing the LU of the LU number so obtained via the FC interface 160 (step 1000).

Here in this system wherein the application 140 designates a file by a description of a path to the logical position of the file in terms of a logical drive name, a directory name and a file name, the description of the path such a logical position (in terms of the logical drive, the directory and the file) serves as the logical position name of the file. Normally, the logical position name is an item of information on a logical position used by the application for designating the object of access.

The file system 110, in order to manage such logical positions, not only manages hierarchical logic structures between logical positions such as a directory structure, but also describes matching or mapping between the logical position name and LU number of each logical position name in the LU logical position name table 191 and manages it. It further describes matching between the logical position name and the intra-LU address of each logical position in the logical position name table 195 and manages it. In this embodiment one disk array may have one or more LU's. FIG. 3 shows the logical/physical matching information in a disk array, for example, disk array 200-1. Disk array 220-2 will have its own logical/physical matching table. The LU No. 2 in row 5030 of FIG. 3 has a special logical volume 4, i.e., COMMAND VOLUME, that is different from the logical volumes in LU. No. 0 or 1. In an alternate embodiment, an LU number also denotes the disk array 200 providing the LU of that LU number.

Next, as an disk array, for example, 200-1 receives a read/write command from the host 100 via the FC interface 260-1, the control section 300-1, using the logical/physical matching information 321-1 in the memory 320-1, specifies a logical volume number associated with the LU number and a logical volume address associated with the intra-LU address, and carries out address conversion into the physical address by determining an area in the disk unit 210-1 matching the logical volume and logical volume address (step 1010). Then, the control section 300, where read is requested, reads out data from the physical address obtained by the address conversion of the disk unit 210-1 and transfers it to the host 100 or, where write is requested, stores the data transferred from the host 100 and a parity generated in that connection at the physical address obtained by the address conversion of the disk unit 210-1 (step 1020).

The logical/physical matching information 321-1 here used for the address conversion at step 1010 has the contents listed in FIG. 3 for example.

In FIG. 3, the LU number 5001 and the intra-LU address 5002 respectively indicate an LU number and an intra-LU address that the file system 110 of the host 100 designates by read/write processing command. The logical volume number 5003 is a logical volume number matching the LU specified by the LU number 5001, and the logical volume address 5004 is an address in the logical volume matching the intra-LU address 5002.

Further, the physical address 5020 is an address indicating an area on a disk unit in which data 5022 and parities 5024 are to be stored, and has the parity group number 5005, the disk unit numbers 5006 and the intra-disk unit addresses 5007, one each for the data 5022 and the parities 5024. The parity group number 5005 indicates an individual parity group 220. The disk unit number 5006 indicates an individual disk unit 210, and the intra-disk unit address 5007 is an address indicating an area in a disk unit.

Referring back to FIG. 2, the description will be continued for the example of disk array 200-1.

The control section 300-1, upon completion of the read/write processing described above, executes usage acquisition processing, in which read or write and sequential or random access in the read/write processing are distinguished, and updates the logical volume usage 322-1 in the memory 320-1 which has been the object of read/write (step 1030).

Here the logical volume usage 322-1 has the contents listed in FIG. 4 for instance.

As shown, a logical volume number 5101, and a disk use duration (in microseconds) 5102 for read or write and sequential or random access are described for each logical volume. Therefore, at step 1030, the length of time taken to read or write is added to the disk use duration 5102 of the determined access type matching the logical volume number 5101 of the logical volume which is the object of reading or writing.

Next will be described usage collection processing in which the host 100 collects the usage of disk units 210 from each disk array 200.

FIG. 5 shows the sequence of this processing of an embodiment of the present invention.

First, a disk array 200 provides the host 100 with an LU (command volume) for information transfer. This LU (command volume) is a logical volume having no matching disk unit 210 as shown, for example, by row 5030 (LU No. 2, Logical Volume No. 4 with the words "Command Volume" as the parity group 5005) in the logical/physical matching table of FIG. 3.

In the host 100, the manager 130 issues a write command of the SCSI standard to the LU (command volume), for example, logical volume 4 of row 5003, of a disk array, for example 200-1, via the FC interface 160, and writes parameters for information collection as data (step 1100).

When the disk array 200-2 receives the write command from the host 100 via the FC interface 260-2, the control section 300-2 perceives that the write command concerns the LU (command volume), and checks an operation code contained in the parameters for information collection transferred from the host 100 to distinguish the requested information. It then readies the requested information on the memory 320-2 (step 1110). After that, the control section 300-2 reports the completion of write to the host 100 via the FC interface 260-2 (step 1120).

Next in the host 100, the manager 130 issues a read command of the SCSI standard to the LU (command volume) of the disk array 200-2 via the FC interface 160 (step 1130).

When the disk array 200-2 receives the read command from the host 100 via the FC interface 260-2, the control section 300-2 perceives that the read command concerns the LU (command volume), and transfers the information readied on the memory 320-2 to the host 100 via the FC interface 260-2 (step 1140). After that, the control section 300-2 reports the completion of read to the host 100 via the FC interface 260-2 (step 1150).

Here, the parameters for collecting the information to be written at step 1100 and the information to be readied at step 1110 in this connection include, a table of three kinds of information including logical volume information, parity group information and usage information.

Figure 6:
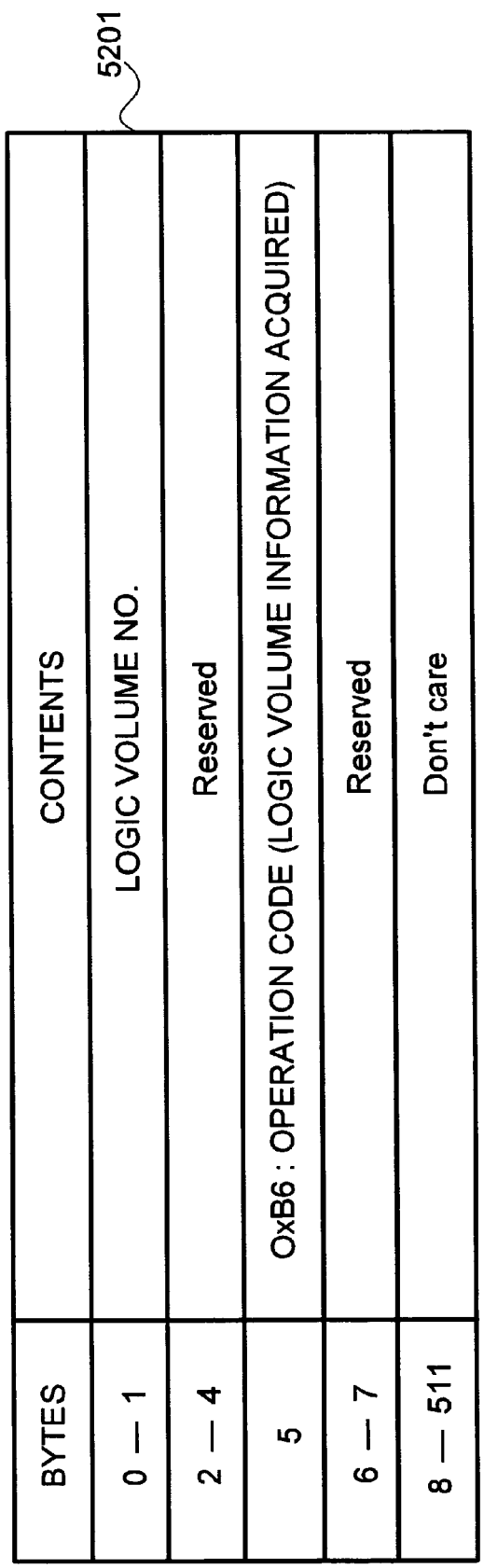
FIG. 6 is a list of parameters of logical volume information for use in the first embodiment of the invention.

For example, where the parameters for collecting the information to be written at step 1100 are parameters for logical volume information as shown in FIG. 6, for a logical volume identified by the logical volume number 5201 designated by the 0th through 1 st bytes, logical volume information (information indicating the configuration of that logical volume in the disk array 200) shown in FIG. 7 is readied. Incidentally, in the logical volume information shown in FIG. 7, various items of information 5202 of the logical volume identified by the logical volume number 5201 designated by the 0th through 1 st bytes are described in the 8th through 47th bytes, and items of information 5203 of logical volumes constituting the LU to which this logical volume belongs are described in the 49th through 121st bytes.

Figure 8:
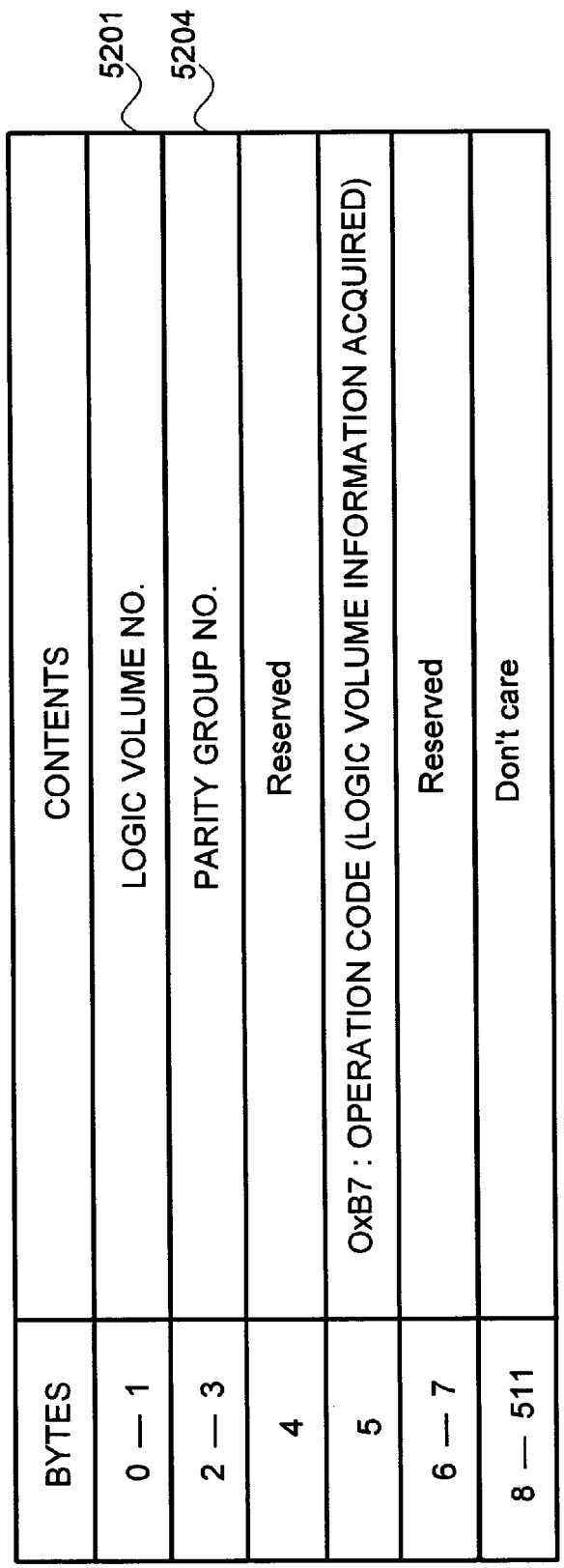
FIG. 8 is a list of parameters of parity group information for use in the first embodiment of the invention.

In another example, where the parameters for collecting the information to be written at step 1100 are parameters for parity group information as shown in FIG. 8, for a parity group 220 identified by the parity group number 5204 designated by the 2nd through 3rd bytes, to which the logical volume identified by the logical volume number 5201 designated by the 0th through 1st bytes belongs, parity group information (items of information indicating the configuration of the parity group 220 in the disk array 200 including the RAID configuration and the type denomination of the disk unit 210) shown in FIG. 9 is readied. Incidentally, in the parity group information shown in FIG. 9, various items of information 5205 of a parity group identified by the parity group number 5204 described in the 2nd through 3rd bytes are described in the 8th through 29th bytes, and items of information 5206 of logical volumes allocated to that parity group are described in the 30th through 287th bytes.

For the formation of the logical volume information and parity group information mentioned above in the control section 300 here, part or the whole of the logical/physical matching information 321 is used. Incidentally, the manager 130 has information on the performance of disk units 210 of each type, and accordingly the performance features of disk units 210 constituting a parity group 220 can be known according to the model denomination of the disk units 210.

In yet another example, where the parameters for collecting the information to be written at step 1100 are usage parameters as shown in FIG. 10, for a logical volume identified by the logical volume number 5201 designated by the 0th through 1st bytes, usage information (resource usage in the disk array 200) shown in FIG. 11 is readied. Incidentally, in the usage information shown in FIG. 11, occupation duration's 5207 of the logical volume usage 322, whose example is shown in FIG. 4, of the logical volume identified by the logical volume number 5201 designated by the 0th through 1st bytes are described in the 136th through 159th bytes. In the 48th through 79th and the 100th through 115th bytes, information items 5208 and 5209 on the number of receipts of various commands by that logical volume, the number of hits on the cache 330 and the like are described, and in the 160th through 991st bytes, information item 5210 on the occupation of the processor 310, that of the internal bus and so forth are described.

Here, the control section 300 has acquired with respect to each logical volume the number of receipts of various commands by that logical volume, the number of hits on the cache 330, the occupation of the processor 310, that of the internal bus and so forth, and these information items, as shown in FIG. 11, are reflected in the usage information. In addition, the manager 130 can determine the rate of occupation duration per unit length of time by, for instance, dividing the average duration of a plurality of acquisitions by the interval of acquisition.

Incidentally, the manager 130 of the host 100, by issuing an INQUIRY command of the SCSI standard to an LU and obtaining response data separately from the above-described processing charted in FIG. 5, can obtain from the response data the logical volume number to which the LU belongs.

Next will be described relocation object determination processing by which the host 100 determines the data to be relocated in the first embodiment.

Figure 12:
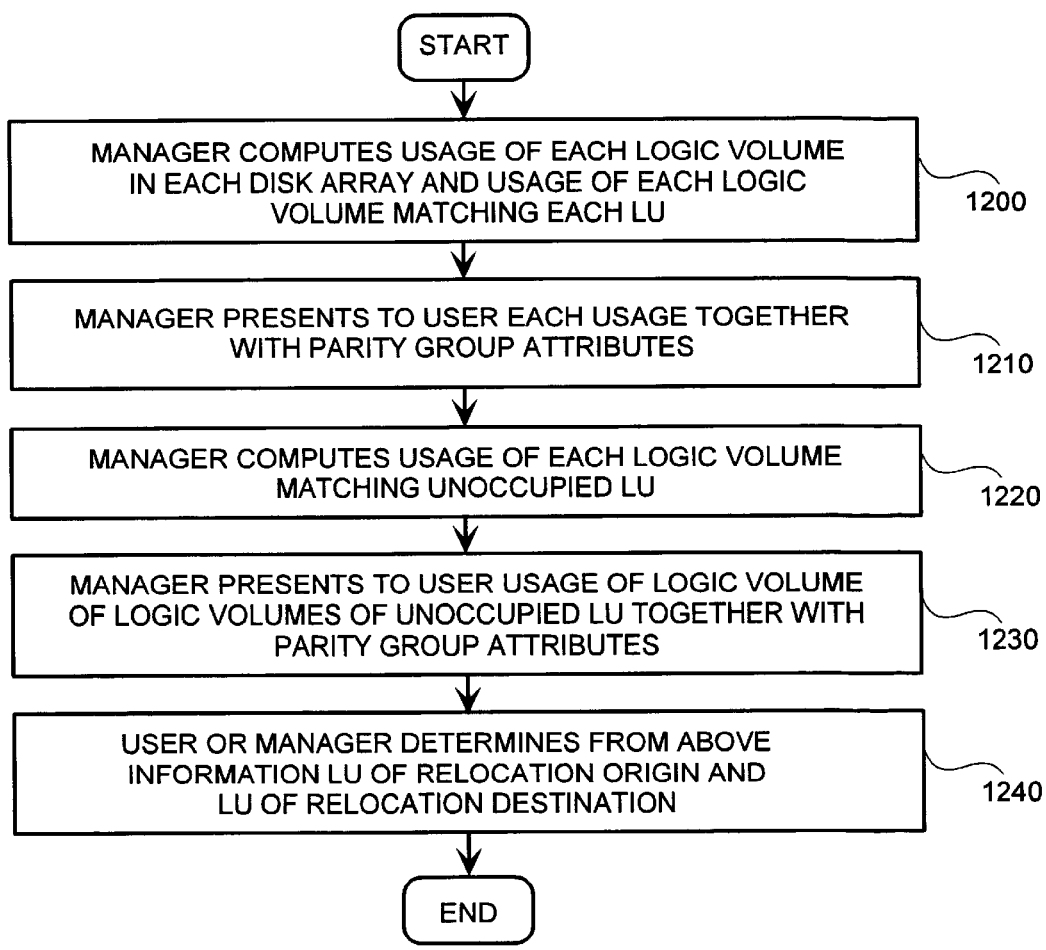
FIG. 12 is a flow chart showing the procedure of relocation object determination processing in the first embodiment of the invention.

FIG. 12 shows the sequence of this processing of an embodiment of the present invention.

In the host 100, the manager 130 distinguishes LUs used by the OS 120 from unused LUs (unoccupied LUs) by referencing, for instance, the LU logical position name table 191 stored in the local disk 190. With respect to each of the LUs being used by the OS 120, the manager 130 computes the usage of each logical volume in each disk array 200, for example disk arrays 200-1 and 200-2, the usage of the logical volume matched by each LU, and so forth from the logical volume number belonging to that LU obtained by issuing the INQUIRY command, the logical volume information in each disk array 200 obtained by the aforementioned usage collection processing, the usage of parity group information and logical volume, and the like (step 1200).

The results of these calculations, together with the attributes of the parity group 220 to which the logical volumes belong (RAID configuration, model denominations of disk units 210, performance features of the disk units 210 and so forth) are presented to the user (step 1210).

The manager 130 also presents unoccupied LUs to the user. For each LU, it calculates the usage of the logical volume matched by each logical volume from the logical volume number belonging to that LU obtained by issuing the INQUIRY command, the logical volume information in each disk array 200 obtained by the aforementioned usage collection processing, the usage of parity group information and logical volume, and the like (step 1220), and presents to the user the results of these calculations in the parity group 220 and the like related to each unoccupied LU (step 1230).

Here, the aforementioned items of information including usage can be displayed by the host 100 or another computer connected via a network to the host 100.

The user references the above-stated items of information with respect to each LU in each disk array 200 to determine the LU whose data are to be relocated (relocation origin LU) and the relocation destination LU for the data, though the manager 130 may as well determine the data relocation origin and the relocation destination from the above-stated items of information instead of having the user do it (step 1240). The determination of these particulars of relocation is so accomplished that, for instance, load distribution among the disk arrays 200, load distribution among the parity groups 220, and allocation of LUs in which files requiring high performance high performance parity groups 220 can be realized after the relocation. The size of the relocation destination LU here should not be smaller than that of the relocation origin LU. Incidentally, the size of each LU can be acquired with a READ CAPACITY command of the SCSI standard.

Next will be described data relocation processing which the host 100 performs following the relocation object determination processing described above. For purposes of illustration only, let disk array 200-1 be the relocation origin LU and disk array 200-2 be the relocation destination LU.

Figure 13:
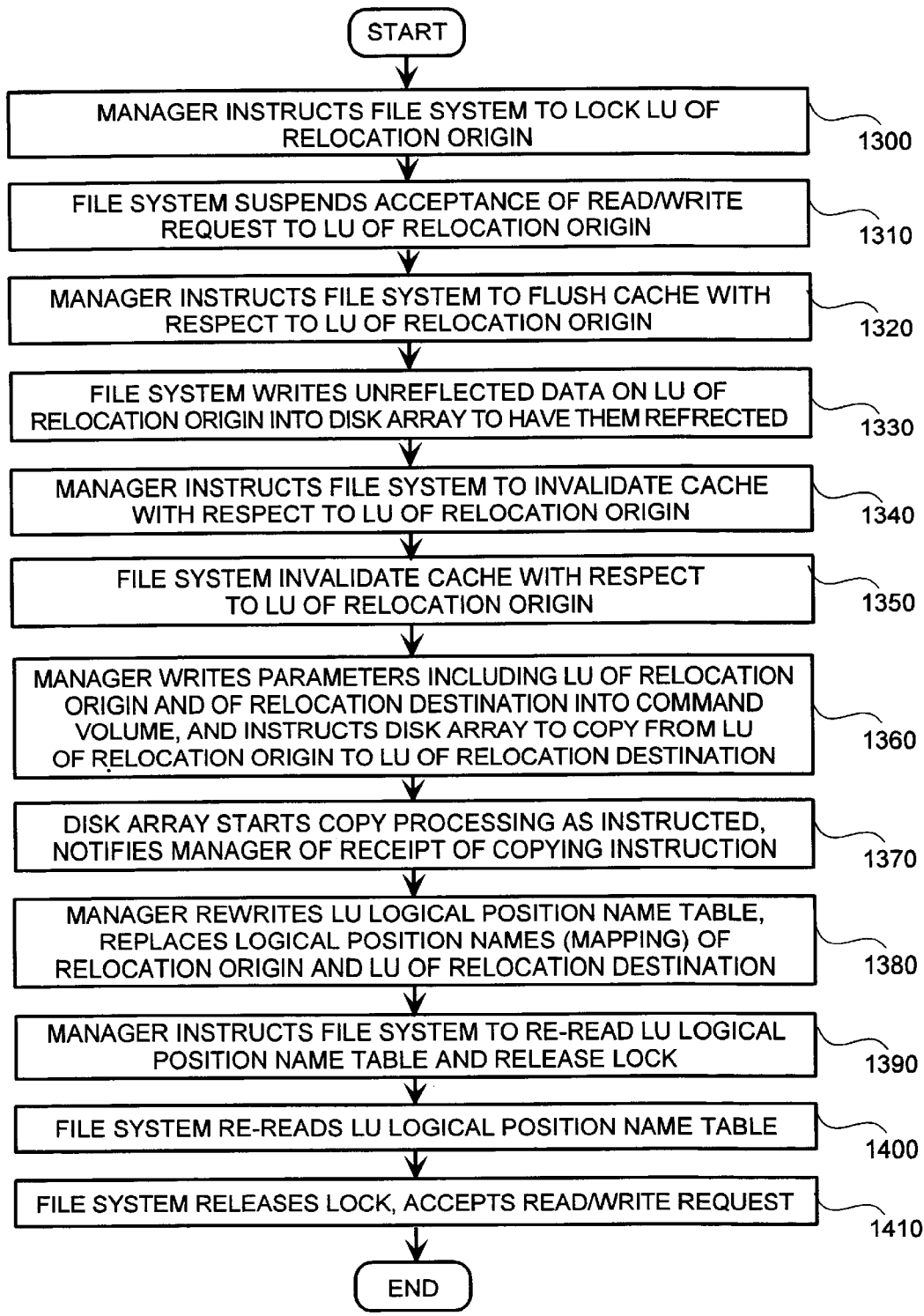
FIG. 13 is a flow chart showing the procedure of relocation processing in the first embodiment of the invention.

FIG. 13 shows the sequence of this processing of an embodiment of the present invention.

In the host 100, the manager 130 first instructs the file system 110 to lock the relocation origin LU (step 1300). In response, the file system 110 suspends acceptance of any request to read/write from or into the relocation origin LU (step 1310). Then the manager 130 instructs the file system 110 to flush the cache with respect to the relocation origin LU (step 1320).

Following this, the file system 110 writes into the relocation origin LU of the disk array 200-1 any data to be stored in the relocation origin LU but cached in the memory on the host 100 but not written into the disk array 200-1 (step 1330).

Then the manager 130 instructs the file system 110 to invalidate the cache with respect to the relocation origin LU (step 1340). Following this, the file system 110 invalidates any data to be stored in the relocation origin LU but cache in the memory on the host 100 (step 1350).

The above-described LU locking and flushing and invalidation of the cache may regarded as equivalent to so-called unmounting of the LU.

Next the manager 130 instructs the disk array 200-2 in which the relocation destination LU is present to copy data from the relocation origin LU, disk array 200-1, to the relocation destination LU, disk array 200-2 (step 1360). This instruction, as in the usage collection processing described above, is accomplished by writing into the command volume of the aforementioned disk array 200-2 copy instructing parameters including a copy instructing operation code, the relocation origin LU and the relocation destination LU. Having received this instruction, the disk array 200-2 starts copy processing to be described later, and notifies the manager 130 of the receipt of the copy instruction (step 1370).

Now, notified of the receipt of the copy instruction,the manager 130 rewrites the LU logical position name table 191 stored in the local disk 190, to be used by the file system 110, and replaces the logical position names (mapping) of the relocation origin LU and of the relocation destination LU with each other (step 1380). Further, the manager 130 instructs the file system 110 to update the LU logical position name table 191 (re-reading) and to release the lock which was instructed at step 1300 (step 1390).

In response, the file system 110 re-reads the LU logical position name table 191 to update information (step 1400), and release the aforementioned lock to accept a read/write request step 1410).

The above-stated updating and lock release may be regarded as so-called mounting of the LU.

As a result, when the file system 110 reads from or writes into an LU, including cases in which the application 140 reads from or writes into an LU via the OS 120 and the file system, if the object LU of read/write is an LU to relocated, read/write by the file system 110 will be from or into the relocation destination LU.

Hereupon, examples of the LU logical position name table 191 rewritten at step 1380 described above are shown in FIG. 14 and FIG. 15.

The tables of FIGS. 14 and 15 show another embodiment of the LU NO. of the present invention. Both tables show, the disk array number, ID and LUN that indicate an LU number 6001. FIG. 14 shows a logical position name 6002 in a directory form, while FIG. 15 shows a logical position name 6002 in a drive form. Both show the logical position of the LU as a storage area to be used by the application 140.

Next will be described copy processing that takes place when, in the above-described relocation processing, a disk array, for example, 200-2 receives a copying instruction from the host 100.

FIG. 16 shows the sequence of this processing of an embodiment of the present invention.

In a disk array 200-2 in which the relocation destination LU is present, when a copying instruction is received from the host 100 via the FC interface 260-2, the control section 300-2 readies a copy area management table 323-2 regarding the relocation destination LU designated by the copying instruction on the memory 320-2 and makes setting (step 1500). Particulars of the copy area management table 323-2 are shown in FIG. 17.

In FIG. 17, the copying destination LU number 6101 and the copying origin LU number 6102 are numbers indicating the relocation destination LU, e.g. disk array 200-2, and the relocation origin LU, disk array 200-1, respectively, on the FC 600. More specifically, in this embodiment, the LU No. are represented uniquely by either eight-byte numbers (WORLD WIDE NAME) or three-byte numbers (N_PORT ID) designated by the host 100. In another embodiment the LU No. can be represented by disk array No., ID and LUN like in FIGS. 14 and 15. The number of blocks to be copied 6103, i.e. the number of blocks (smallest read/write units) in the area to be copied, represents the magnitude of the area to be copied, and in the bit map 6104, a bit is allocated to each block in the area to be copied in the LU, wherein "1" denotes uncopied and "0", copied. At the time of initialization, every bit in the area to be copied is set to "1".

Now referring back to FIG. 16, the control section 300-2 notifies the host 100 of the receipt of the copying instruction (step 1510). This notification is given at the time of actual copying after the setting of the aforementioned information following the actual receipt of the copying instruction. Therefore the lapse of time from the receipt of the copying instruction until its receipt is short.

Next, the control section 300-2 performs copying to read the contents stored in the relocation origin LU, disk array 200-1, via the FC interface 260-2 and to stored them into the relocation destination LU, disk array 200-2 (step 1520).

Then, with respect to the area to be copied in the LU, the control section 300-2 alters the bits of the blocks corresponding to the copied areas shown in FIG. 17 successively to "0" (step 1530) and, upon completion of the blocks 6103 to be copied, the copy processing is ended (step 1540).

In addition, if the disk array 200-1 in which the relocation origin LU is present and the disk array 200-2 in which the relocation destination LU is present, are the same, LU copying may be accomplished within the disk array 200-1 (or 200-2).

Incidentally, any read/write action by the host 100 from or into the LU to be relocated is accomplished, even during a copying process, upon the relocation destination LU, i.e. the disk array 200-2 in which the relocation destination LU is present.

Next will be described the processing in the case wherein a disk array 200-2 has received a read/write command regarding the LU to be relocated during the aforementioned copy processing.

Figure 18:
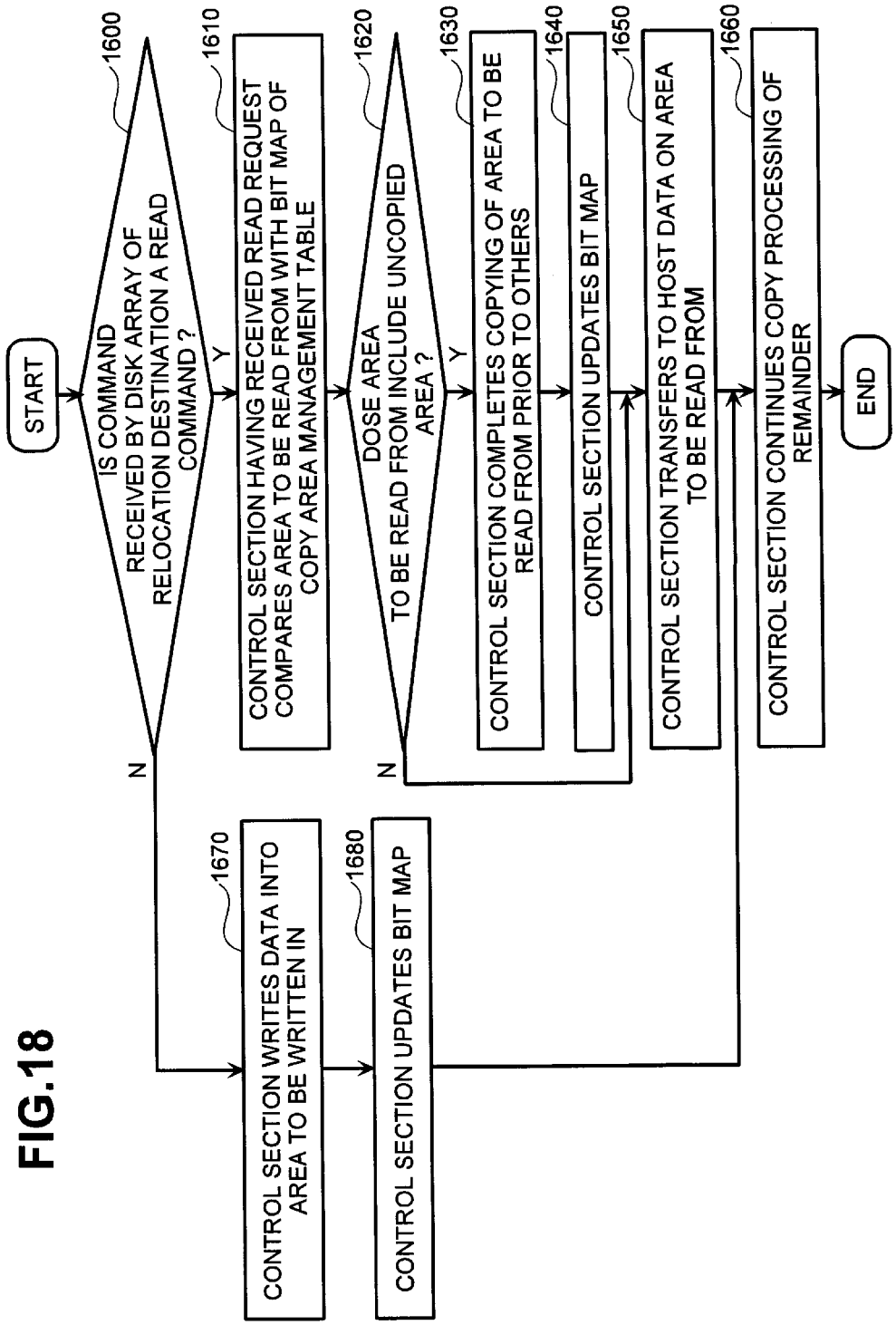
FIG. 18 is a flow chart showing the procedure of processing of a command to read/write from or into a relocation destination LU in the course of copying shown in FIG. 16 in the first embodiment of the invention.

FIG. 18 shows the sequence of this processing of an embodiment of the present invention.

In the disk array 200-2, when the control section 300-2 receives a read command via the FC interface 260-2, it compares the range to be read and the bit map 6104 shown in FIG. 17 (step 1610); if any uncopied part remains in the area to be read (step 1620, Y), the control section 300-2 reads out and copies data in the area to be read with priority (step 1630), updates bits in the area to be read in the bit map 6104 to "copied" (step 1640), and transfers the copied data in its own disk array 200-2 to the host 100 (step 1650). On the other hand, if the area to be read has been wholly copied (step 1620, N), the control section 300-2 immediately transfers the copied data in its own disk array 200-2 to the host 100 (step 1650).

Or the control section 300-2, when it receives a write command via the FC interface 260-2 (step 1600, N), writes the data transferred from the host 100 into the area to be written (step 1670), updates bits in the area to be written in the bit map 6104 shown in FIG. 17 to "copied" (step 1680), and continues copying from the remaining uncopied parts (step 1660).

The processing so far described enables a disk array in which any relocation destination LU is present to process a read/write command from the host 100 even during a copying process.

Also, in this read/write processing, the control section 300 performs the earlier described usage acquisition processing at the same time.

Incidentally, the manager 130 of the host 100, while copying during the aforementioned copying process, can inquire of the disk array 200-2 about copying progress information by writing into the command volume of the disk array 200-2 parameters for acquiring the state of copying progress and reading the data.

In this case, the control section 300-2 of the disk array 200-2 having accepted a write command regarding a command volume checks the parameters written into the command volume in accordance with the command, references the copy area management table 323-2 to make ready on the memory 320-2 items of information including the rate of copying progress, and notifies the host 100 of the completion of writing. In response, the manager 130 of the host 100 reads out of the aforementioned command volume, and the control section 300-2 answers the inquiry about copying progress and other factors by transferring data readied on the memory 320-2 in response to the reading.

In this first embodiment, appropriate arrangement of data among a plurality of disk arrays 200 by relocation of LUs can be realized so that logical equivalence can be ensured for the application 140 between before and after the relocation, i.e. the logical position name to be used by the application for accessing the object of access remains the same.

Although, relocation of data among a plurality of disk arrays 200 was described with respect to this embodiment, this description is not intended to limit the scope of the invention. Storage subsystems for data to be relocated need not be disk array subsystems. They may be some other kind of storage subsystems using magnetic disk units, floppy disks, zip drives, jazz drives, photomagnetic disk units, magnetic tape devices, semiconductor disk units or the like.

Further, in this embodiment, the manager 130 of the host 100 is supposed to collect information or give instructions using a command of the SCSI standard via the FC 600. However, some other kind of command may be used as well. Also, the manager 130 may collect information or give instructions using a protocol prescribed under the SNMP (Simple Network Management Protocol), for instance, via the network 700, instead of the FC 600.

Further, with respect to this embodiment, the logical volume usage 322-2 acquired by the control section 300-2 of a disk array 200-2 is supposed to the cumulative total of the durations of use. However, the control section 300-2 may as well accumulate in the memory 320-2 durations of use in unit lengths of time lapse in the form of the rate of use, this may be collected by the manager 130 of the host 100 as the logical volume usage 322-2.

Next will be described a second embodiment of the invention.

Figure 19:
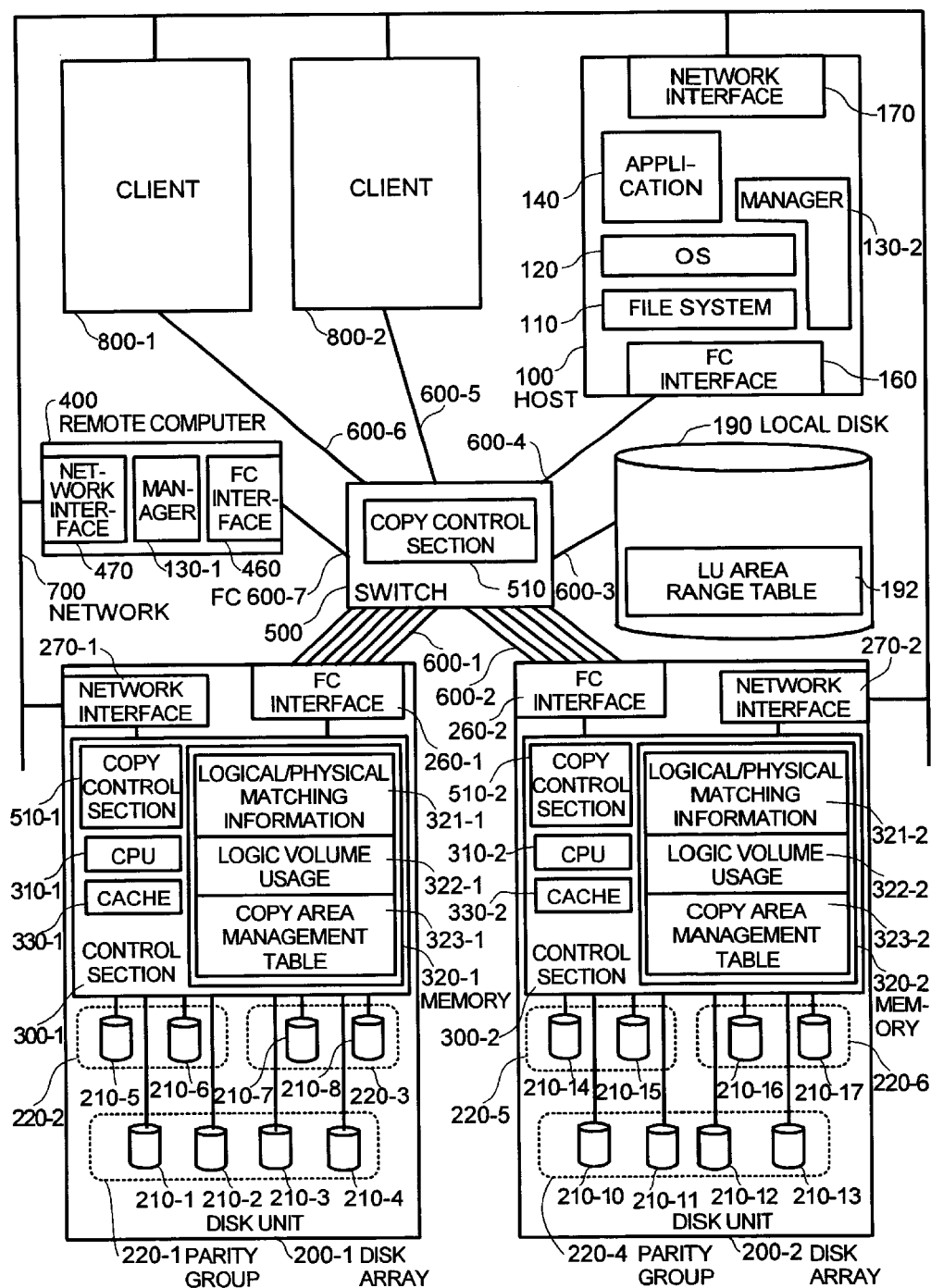
FIG. 19 is a diagram illustrating the configuration of a computer system of a second embodiment of the present invention.

FIG. 19 illustrates the configuration of a computer system of a second embodiment of the invention.

As illustrated, the computer system in this embodiment has a similar configuration to the computer system in the first embodiment illustrated in FIG. 1. However, this embodiment has in local disk 190 an LU area range table 192 and in its switch 500 a copy control section 510.

In such a configuration in this embodiment, the disk arrays 200-1/2 acquire the usage of disk units 210, and the host 100 collects usage from the plurality of disk arrays 200, and presents it to the user including analyses based on files of this computer system. Further the host 100 alters data for file management (metadata). The switch 500, as instructed by the host 100, copies data stored in the disk arrays 200. This enables files to be relocated among the plurality of disk arrays 200 to efficiently arrange the data.

Now, in the above-described first embodiment, the file system 110 of the host 100 manages LUs as differentiated between those in use and those not in use. By contrast in this embodiment, the file system 110 uses all the LUs, and manages the set of the areas of all the LUs as a single area (hereinafter to be referred to as an "integrated area"). Files in the integrated area are managed with metadata. The metadata are stored in a predetermined position in the integrated area.

The computer system in this second embodiment will be described in detail below.

Figure 20:
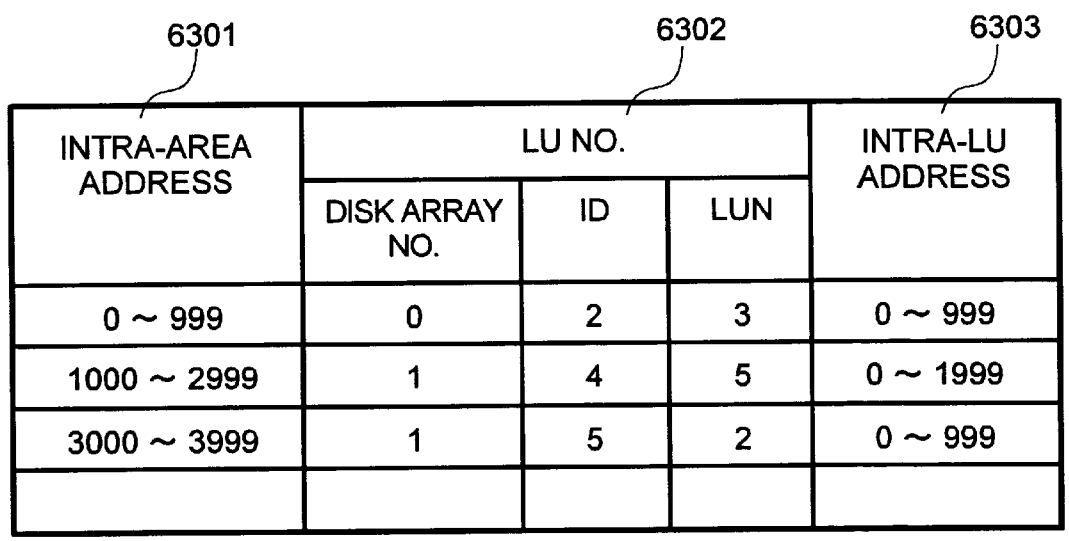
FIG. 20 shows an LU area range table for use in the second embodiment of the invention.

First, one example of LU area range table 192 used by the file system 110 to manage the integrated area in this embodiment is illustrated in FIG. 20.

In the figure, an intra-area address 6301 is an address in the integrated area. A disk array number, an ID and a LUN constitute an LU number 6302 indicating an LU to be stored in the matching intra-area address 6301. The ID and LUN have a format given in the SCSI standard. An intra-LU address 6303 is an address in an LU identified by the matching LU number 6302. Thus the LU area range table 192 shows matching or mapping between the range of the integrated area 6301 with that of each LU No. 6302 and intra-LU area 6303.

Next will be described processing by the host 100 to perform a read/write.

Figure 21:
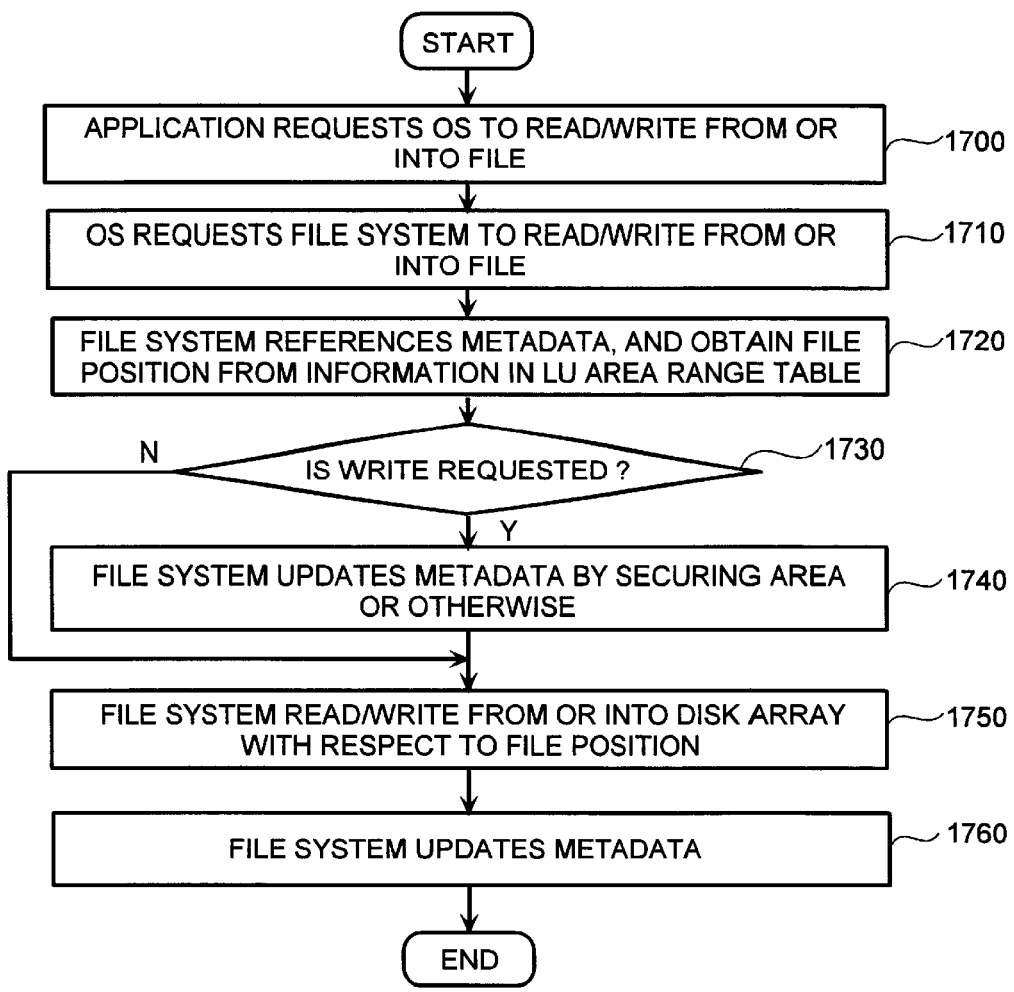
FIG. 21 is a flow chart showing the procedure of read/write processing in the second embodiment of the invention.

FIG. 21 shows the sequence of this processing for this embodiment.

It is presupposed that the application 140 of the host 100 designates the logical positions of the files managed by the file system 110, and reads from or writes into data stored in the disk arrays 200-1 and 200-2. The file system 110, in order to manage data as files, also stores in the disk arrays 200 data for file management (metadata) in addition to the data to be managed as such.

An example of the metadata is illustrated in FIG. 22.

As shown, the metadata, for example, may include a date of preparation 6401, a date of updating 6402, a date of access 6403, an attribute 6404, a logical position name 6405, security information 6406 and a file position (intra-area address) 6407 for each file. Also the range corresponding to each file in the integrated area is represented by the file position 6407. For example, file position 6410 has intra-area address starting at 100 and ending at 150 and its range is (150−100)=50.

Now, as the application 140 in the host 100 designates a file by a specific file logical position name and requests the OS 120 to read from or write into the file (step 1700), the OS 120 requests the file system 110 to read from or write to the file (step 1710). In response, the file system 110 first references the metadata, for example, FIG. 22, and obtains the position of the designated file 6407 (intra-area address) and next uses the LU area range table 192, for example FIG. 20, to get the LU No. 6302 and intra-LU address 6303 (step 1720). If the request is to write, the file system 110 also updates the metadata (step 1740). Then the file system 110 reads from or writes to a disk array 200 with respect to the LU and intra-LU address indicated by the intra-area address ( ) obtained at step 1720 (step 1750), and finally updates the metadata (step 1760).

In updating the metadata here at steps 1740 and 1760, the date of preparation 6401 (FIG. 22), date of updating 6402, date of access 6403, attribute 6404, logical position name 6405, security information 6406, file position 6407 and so forth of the accessed file are updated according to the particulars of the access. For instance, where writing results in a change in file size, the intra-area range indicated by the file position 6407 of the metadata is expanded or compressed accordingly. If a new file is to be prepared, an entry is added to the metadata, or if an existing file is deleted, the matching entry is deleted.

In addition, although the metadata are stored in the disk arrays 200 here, in an alternative embodiment, they may be cached in the memory on the host 100 under the management of the file system 110.

Now in this embodiment, the control sections 300, e.g., 300-1 and 300-2, of the disk arrays 200 perform usage acquisition processing as in the above-described first embodiment. Also, the manager 130 of the host 100 performs usage collection processing as in the above-described first embodiment.

Next will be described file-by-file relocation determination processing performed by the host 100.

Figure 23:
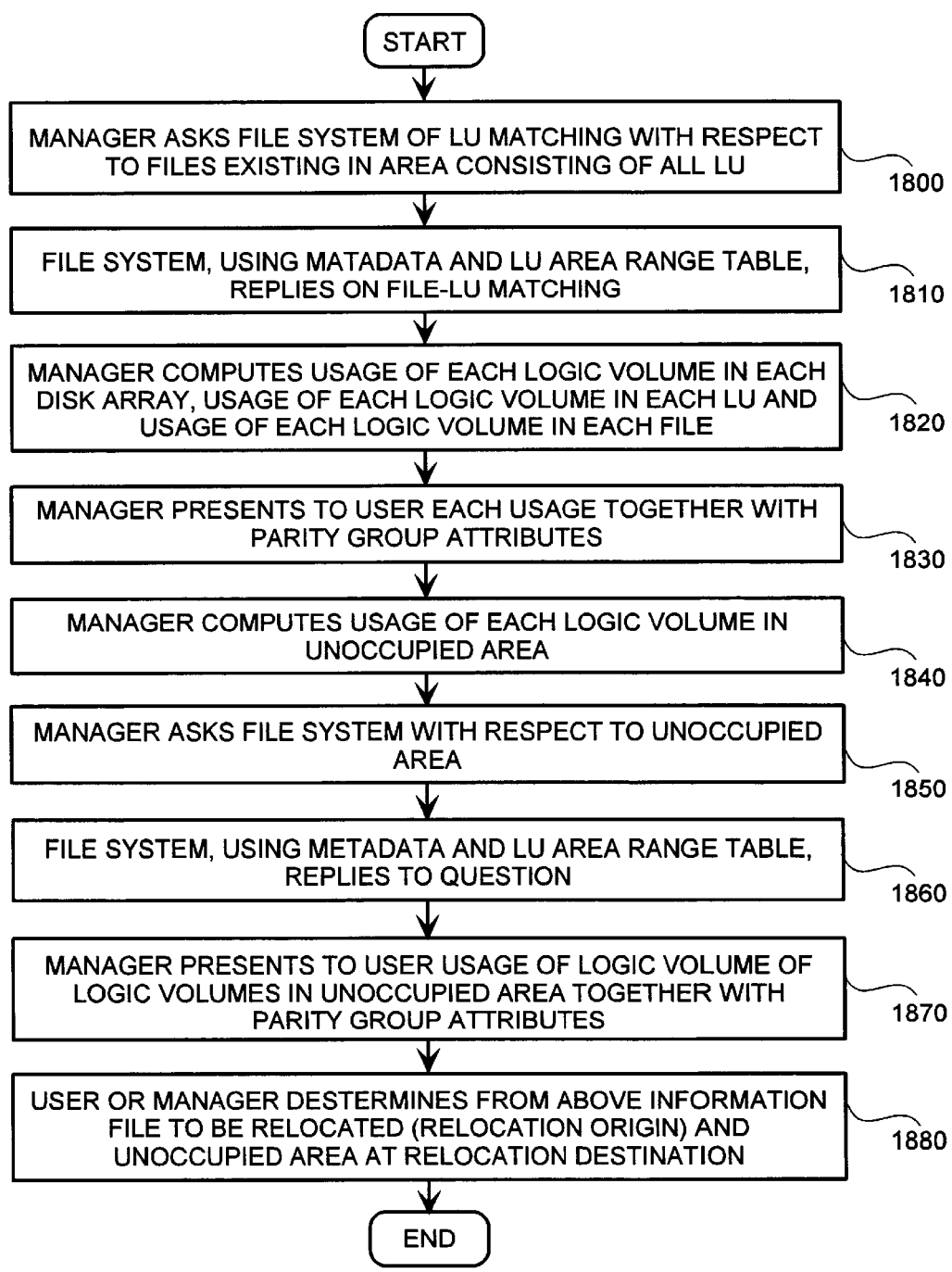
FIG. 23 is a flow chart showing the procedure of relocation object determination processing in the second embodiment of the invention.

The sequence of this processing of an embodiment of the present invention is shown in FIG. 23.

The manager 130 in the host 100 inquires of the file system 110 about file-LU matching with respect to each file present in the integrated area (step 1800). In response the file system 110, using the metadata and the LU area range table 192, answers this inquiry (step 1810).

Next, the manager 130 computes the usage of each logical volume in each disk array 200, that of each logical volume in each LU, that of each logical volume in each file and so forth from the logical volume number belonging to each LU in each disk array 200 obtained by issuing an INQUIRY command (step 1820). Then the manager 130 presents the computation results to the user together with the attribute of the parity group 220 to which each logical volume belongs (step 1830). Thus the host 100 presents, for example, displays, to the user information concerning usage from the viewpoints of the disk arrays 200, logical volumes, LUs, and files.

Also the manager 130 presents to the user available unoccupied areas with respect to LUs and logical volume offered by each disk array 200. Thus the manager 130 inquires of the file system 110 about available unoccupied areas with respect to LUs and logical volumes offered by each disk array 200 (step 1850). In response the file system 110, referencing the metadata and the LU area range table 192, specifies unoccupied areas where no file is present, and replies to the manager 130 (step 1860). Also the manager 130 presents to the user in a classified form, according to various aspects of usage obtained by the usage collection processing, the usage of logical volumes in unoccupied areas together with the attributes of the logical volumes and the parity groups 220 (step 1870).

The host 100 or another computer network-connected to the host 100 can display information on usage and unoccupied areas. The user determines, on the basis of these items of information, the file to be relocated and the unoccupied area for which the relocation is to be destined. Or the manager 130, on the basis of these items of information, automatically determines a similar object of relocation or unoccupied area (step 1880).

Optionally, the file system 110 of the host 100 may monitor the read/write request frequencies (access frequencies)from the OS 120 and the application 140 to each file to generate statistical information, and present it to the user together with other items of information.

This enables the user to take into account the frequency of accesses to each file in the host 100 in determining the file to be relocated.

Next will be described relocation processing performed by the host 100 in response to determination by the above-described relocation object determination processing.

Figure 24:
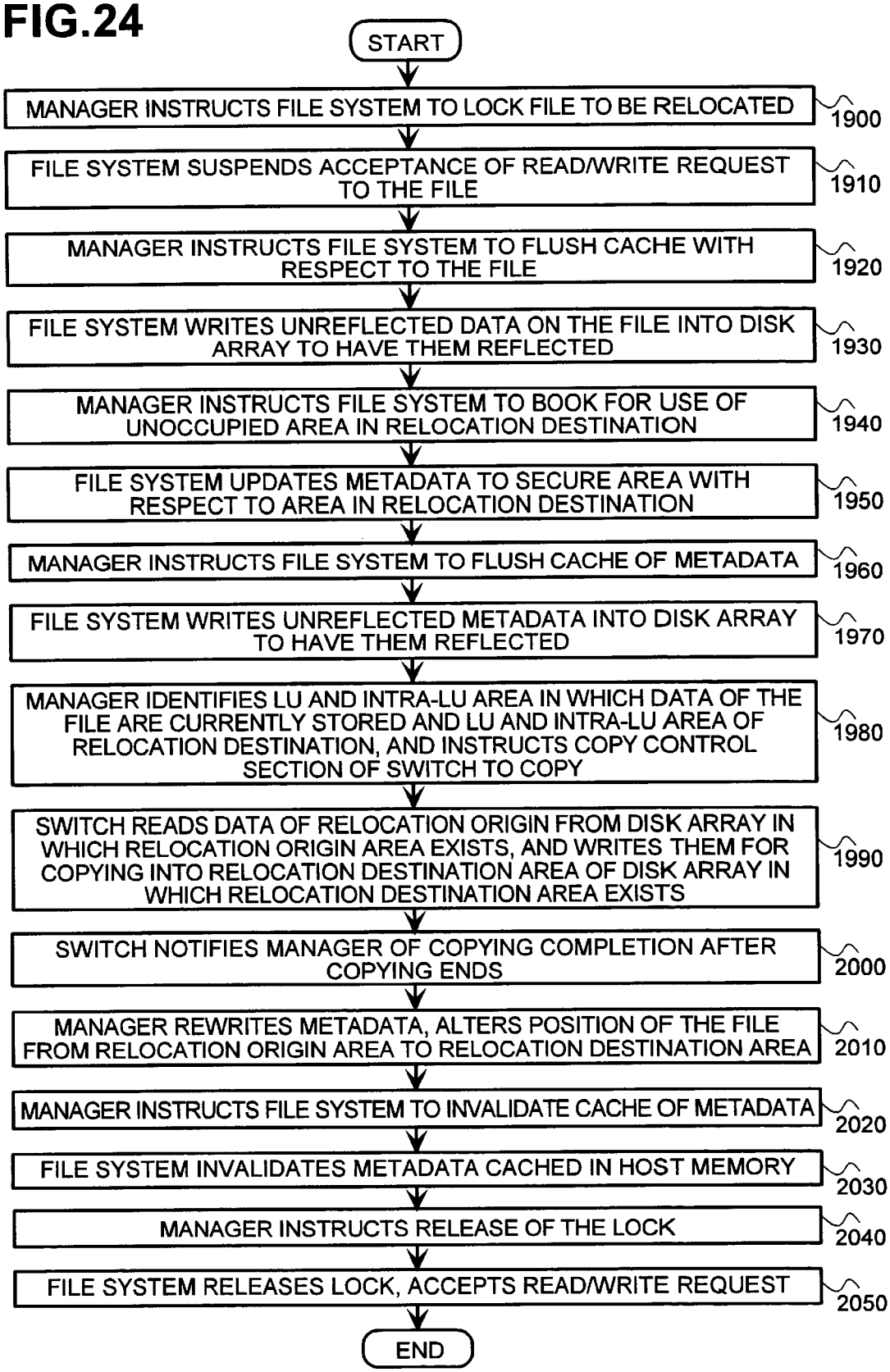
FIG. 24 is a flow chart showing the procedure of relocation processing in the second embodiment of the invention.

FIG. 24 shows the sequence of this processing of an embodiment of the present invention.

The manager 130 in the host 100 instructs the file system 110 to lock the file to be relocated (step 1900). In response, the file system 110 suspends acceptance of a request to read from write into the file (step 1910). Then the manager 130 instructs the file system 110 to flush the cache with respect to the file to be relocated (step 1920). Responding to this, the file system 110, with respect to that file, writes into a disk array 200 data cached in the memory on the host 100 but not yet written into any disk array 200 (step 1930).

Next, the manager 130 instructs the file system 110 to reserve an unoccupied area at the relocation destination (step 1940). In response, the file system 110 updates the metadata to secure the area at the designated relocation destination (step 1950). For example, in the table of FIG. 22, a date of reservation 6420, and a file position 6407 are two possible example entrees. Further the manager 130 instructs the file system 110 to flush the cache of the metadata (step 1960). Responding to this, the file system 110 writes into a disk array 200 the metadata cached in the memory on the host 100 (step 1970).

Then the manager 130 locates the LU and intra-LU area (relocation origin area) and the relocation destinationLUandintr a—LU area in which the data of the designated file are currently stored, and instructs the copy control section 510 of the switch 500 to copy data from the relocation origin area to the relocation destination area (step 1980). This instruction is given by using an EXTENDED COPY command of the SCSI standard.

Having received the copying instruction, the switch 500 reads the data in the relocation origin area from the disk array 200 in which the relocation origin area is present, and copies the designated data by writing the data into the relocation destination area of the disk array 200 in which the relocation destination area is present (step 1990). Then, after the copying is finished, it notifies the manager 130 of the completion of copying (step 2000).

In response the manager 130 rewrites the metadata, and alters the position of the designated file from the relocation origin area to the relocation destination area. This makes the relocation origin area an unoccupied area (step 2010). Next the manager 130 instructs the file system 110 to invalidate the cache of the metadata (step 2020). In response, the file system 110 invalidates the metadata cache in the memory on the host 100 (step 2030).

Further, the manager 130 instructs the file system 110 to release the lock instructed at step 1900 (step 2040). Responding to this, the file system 110 releases the lock, and accepts a request to read from or write into a designated file (step 2050).

Thereafter, when the file system 110 reads from or writes to a file, including cases in which the application 140 reads from or writes into that file via the OS 120 and the file system 110, data copied into the relocation destination area can be read from or written into in a normal way.

The second embodiment of implementing the present invention has been described so far.

In this second embodiment, appropriate arrangement of files among a plurality of disk arrays 200 can be accomplished so that logical equivalence can be ensured for the application 140 between before and after the relocation.

In this embodiment, the manager 130 of the host 100 is supposed to give a copying instruction to the copy control section 510 of the switch 500 using an EXTENDED COPY command of the SCSI standard. However, in other embodiments, some other kind of command may be used as well. Also, as shown in FIG. 19, the disk arrays 200 may have copy control sections 510, and the manager 130 may give a copying instruction to the copy control section 510 of a disk array 200 to cause the disk array 200 to perform copy processing.

Next will be described a third embodiment of the invention.

Figure 25:
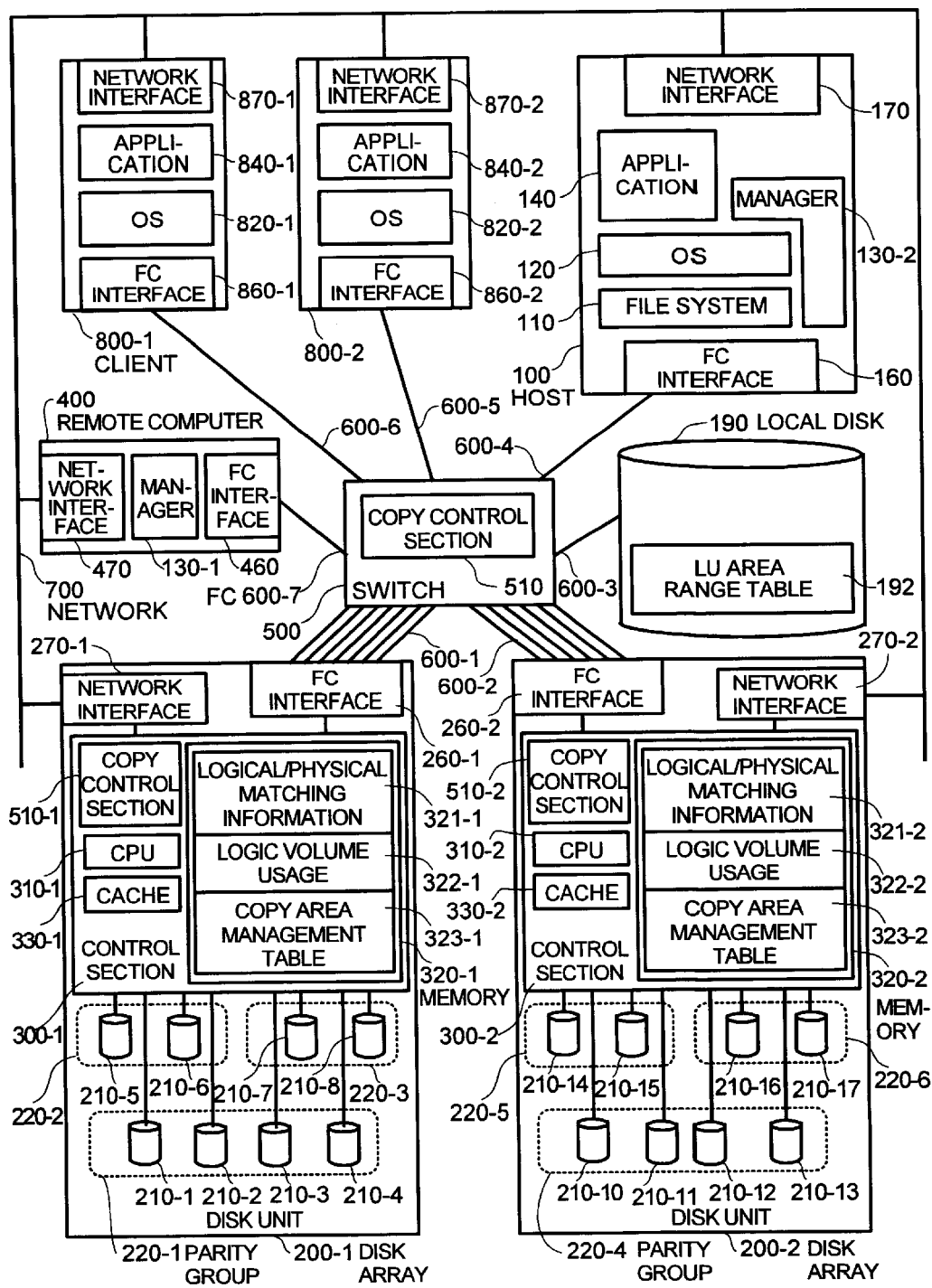
FIG. 25 is a diagram illustrating the configuration of a computer system of a third embodiment of the invention.

FIG. 25 illustrates the configuration of a computer system of the third embodiment of the invention.

As illustrated, the computer system in this third embodiment has a configuration in which the computer system in the second embodiment, illustrated in FIG. 19, has in each of its clients 800, FC interface 860 and network interface 870; and the client 800 is connected by the FC interface 860 to the host 100, the disk arrays 200 and the switch 500 via the FC 600 and by the network interface 870 to the host 100 and the disk arrays 200 via the network 700. In such a configuration in this embodiment, the plurality of clients 800 and the host 100 share the files on the disk arrays 200. In addition, on each client 800, an OS 820 and an application 840 are present. Further, as the hardware configuration of the clients 800, like the above-described host 100, a usual configuration of electronic computers can be used.

Now, in this third embodiment too, as in the above-described second embodiment, the file system 110 uses all the LUs, and manages the set of the areas of all the LUs as a single integrated area. It manages the files in the integrated area with metadata described with reference to the second embodiment.

The computer system in this third embodiment will be described in detail below.

First will be described processing of access by a client 800 to a filed stored in a disk array 200.

Figure 26:
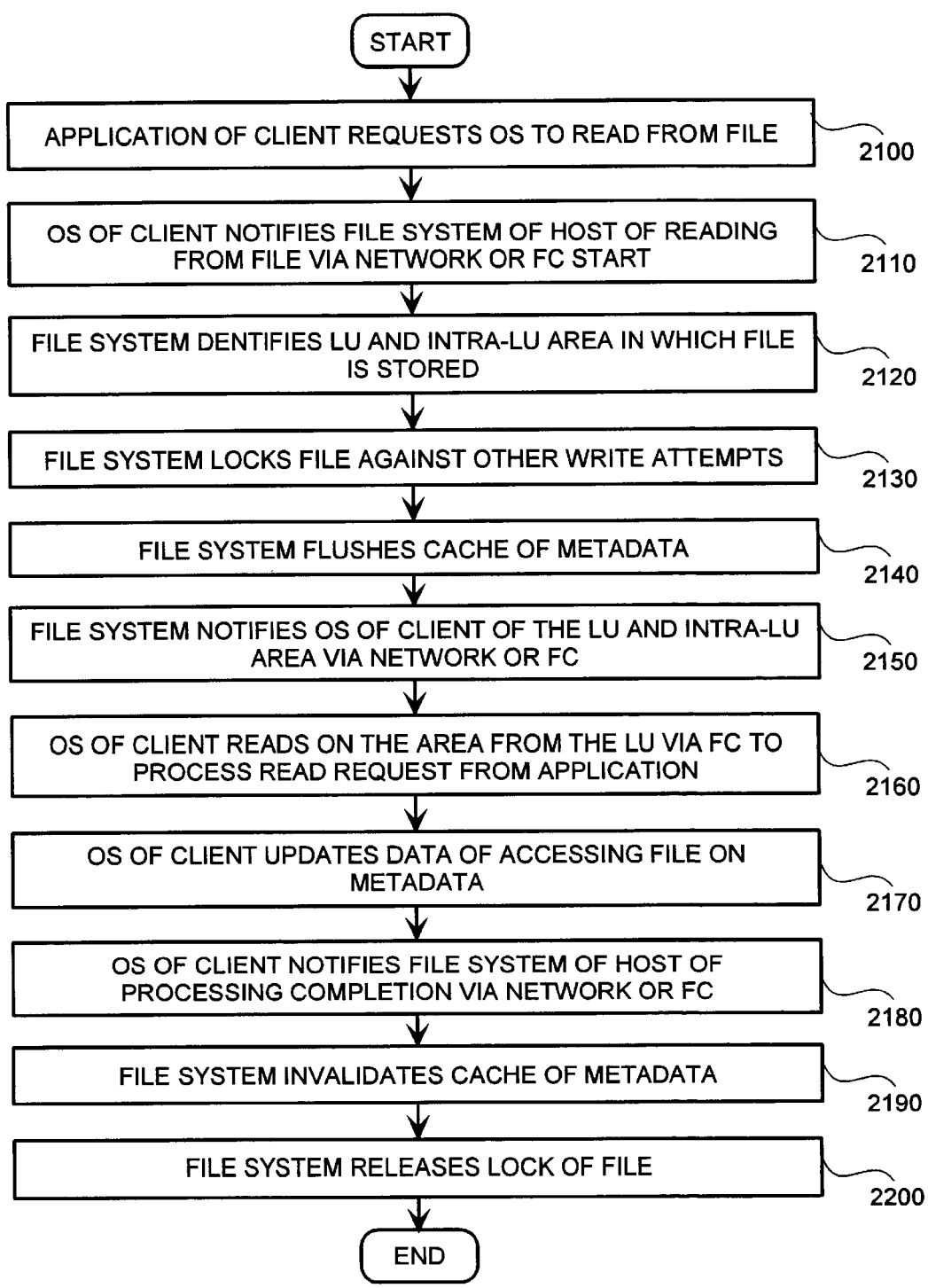
FIG. 26 is a flow chart showing the procedure of processing by the application of a client to read from a file in the third embodiment of the invention.

FIG. 26 shows the sequence of read processing of an embodiment of the present invention.

When in a client, for example, client 800-1, the application 840-1 requests the OS 820-1 to read from a file (step 2100), the OS 820-1 notifies, via the network interface 870-1 or the FC interface 860-1, the file system 110 of the host 100 of reading from the file (step 2110).

In the host 100, the file system 110 notified of reading from the file finds the LU (for example, LU NO. 1, on disk array 200-1) and the intra-LU address at which the file is stored by referencing the metadata and the LU area range table 192 (step 2120), and locks the intra-LU address of the LU in which the file is stored against other writing access (step 2130). Then, after flushing the cache of the metadata on the host 100 (step 2140), the file system 110 gives a reply to the OS 820-1 of the client 800-1 on the LU No. and the intra-LU address at which the file is stored and the LU No. and the intra-LU address at which the metadata are stored (step 2150).

In the client 800-1, the OS 820-1 having received the reply, with respect to the disk array 200-1 in which the LU the file to be read from is stored, reads via the FC interface 860-1 from the intra-LU address at which the file is stored, and processes the request from the application 840-1 (step 2160).

Upon completion of the above-described read processing, the OS 820-1 updates the data of accessing the file on the metadata stored at the LU and the intra-LU address notified from the file system 110 of the host 100 (step 2170). After that, the file system 110 is notified via the network interface 870-1 or the FC interface 860-1 of the completion of processing (step 2180).

In the host 100, the file system 110 notified of the completion of processing invalidates the cache of the metadata on the host 100 (step 2190), and then releases the lock effected at step 2130 (step 2200).

Figure 27:
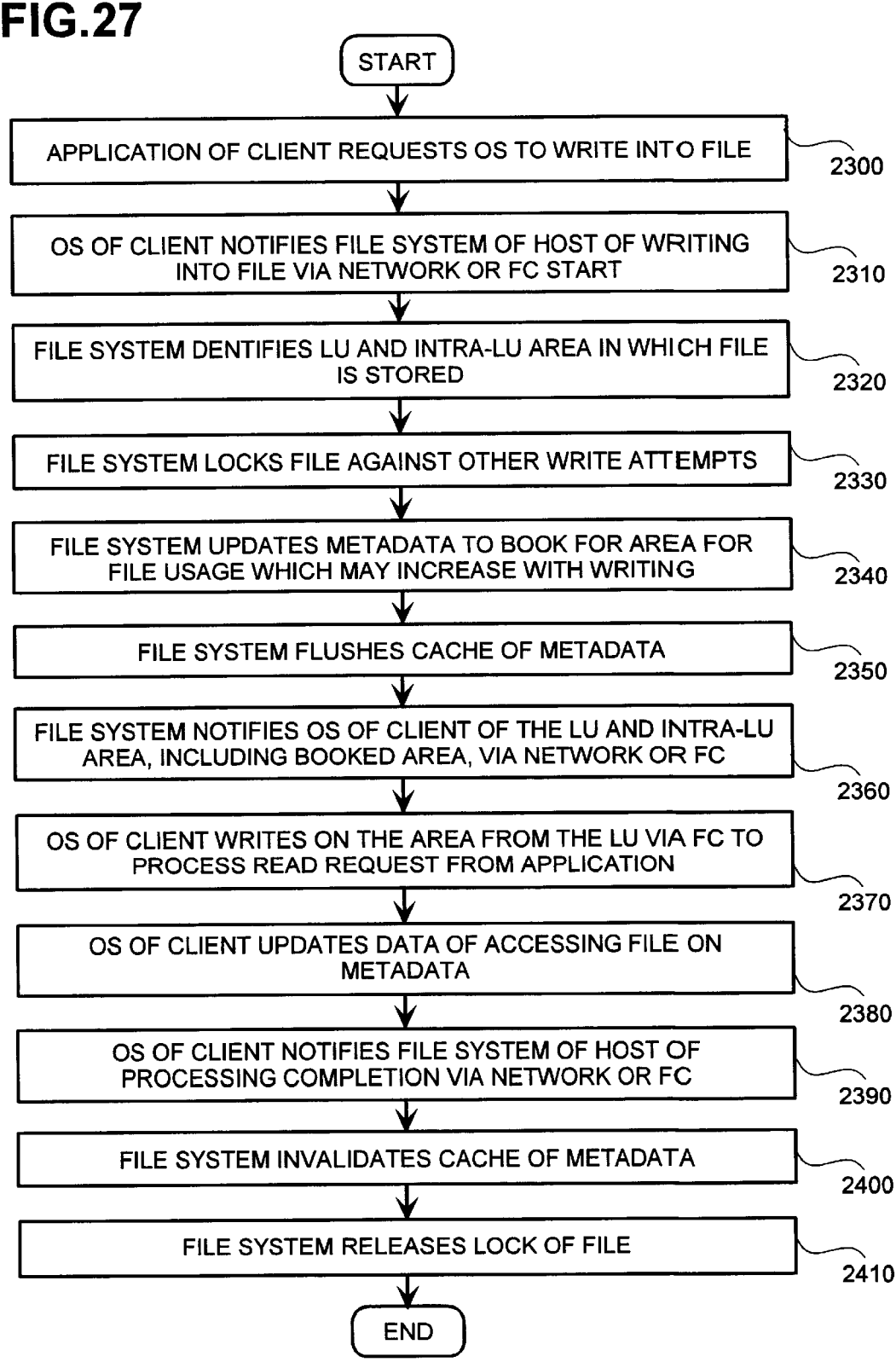
FIG. 27 is a flow chart showing the procedure of processing by the application of a client to write into a file in the third embodiment of the invention.

FIG. 27 shows the sequence of write processing of an embodiment of the present invention.

In a client 800, when the application 840 requests the OS 820 to write into a file (step 2300), the OS 820 notifies via the network interface 870 or the FC interface 860 the file system 110 of the host 100 of writing into the file (step 2310).

In the host 100, the file system 110 notified of writing into the file finds the LU and the intra-LU address at which the file is stored by referencing the LU area range table 192 and the metadata (step 2320), locks the LU and the intra-LU address in which the file is stored (step 2330), describes in the metadata a reservation for an area to be used by a file which may be expanded by writing (step 2340), and then flushes the cache of the metadata on the host 100 (step 2350). Next, the file system 110 gives the OS 820 of the client 800 a reply on the LU and the intra-LU address at which the pertinent file is stored (including the area reserved for use by the file which may be expanded by writing) and the LU and the intra-LU address at which the metadata is stored (step 2360). The quantity of the expansion of the file which may be expanded by writing is supposed to be included in the notification of writing from the OS 820 of the client 800.

In the client 800, the OS 820 having received the reply, with respect to the disk array 200 in which the LU the file to be written into is stored, writes via the FC interface 860 into the intra-LU address at which the file is stored, and processes the request from the application 840 (step 2370).

Upon completion of the above-described write processing, the OS 820 updates the area used by the file, the date of updating, and that of access on the metadata stated at the LU and the intra-LU address notified from the file system 110 of the host 100 (step 2380).

Then it notifies the file system 110 of the completion of processing via the network interface 870 of the FC interface 860 (step 2390).

In the host 100, the file system 110 notified of the completion of processing invalidates the cache of the metadata on the host 100 (step 2400), and then releases the lock effected at step 2330 (step 2410).

By processing access by the clients 800 in the manner described above, the clients 800 and the host 100 can share files stored in the disk arrays 200 without conflict. To add, file access by the host 100 itself is processed in a similar way to the above-described file access by the clients 800.

Next will be described the relocation of a file in this embodiment.

The steps of processing the relocation of a file in this embodiment (usage acquisition processing, usage collection processing, relocation object determination processing and relocation processing) are similar to those in the above-described second embodiment. However, while the file being locked during the above-described read/write processing, relocation processing is not executed. Further, the cache flushing for the file at steps 1920 and 1930 of relocation processing shown in FIG. 24 and writing back to the disk array 200 is instructed by the file system 110 to the client 800 caching the file, and the client 800 executes them.

The third mode of implementing the present invention has been described so far.

In this embodiment, in an environment wherein data stored in the disk arrays 200 are shared for use, physical relocation of files among the plurality of disk arrays 200 can be accomplished so that logical equivalence can be ensured for the applications 140 and 840 before, during, and after the relocation.

Optionally, in this embodiment as well, the file system 110 of the host 100 may monitor the read/write request frequencies from the OSs 120 and 820 and the applications 140 and 840 to each file to generate statistical information, and present it to the user in relocation object determination processing.

In another embodiment, a manager 130 may be provided on each client 800, in order to process the collection of information on usage and to give instructions to the file system 10 of the host 100 and the disk arrays 200 by using the FC interface 860 or the network interface 870.

The present invention is not limited to the above-described embodiments, but a number of variations are conceivable within the scope of the invention.

For example, as illustrated in FIG. 1, FIG. 19 and FIG. 25, the manager 130 can as well be disposed outside the host 100 as a program on a remote computer 400 having a network interface 470 and an FC interface 460. Then, if the aforementioned information is collected and instructions are given via the FC 600 or the network 700 to perform similar sequences of processing as described above, appropriate arrangement of data by the relocation of LUs among a plurality of disk arrays 200 can also be accomplished equivalently for the application 140.

In another example, the files may be shared in the earlier described first embodiment as in the third embodiment. In this case, too, as in the first embodiment, physical relocation of data among a plurality of disk arrays 200 can be accomplished so that logical equivalence can be ensured for the applications 140 and 840 before, during, and after the relocation.

Next will be described a fourth mode embodiment of the present invention.

Figure 28:
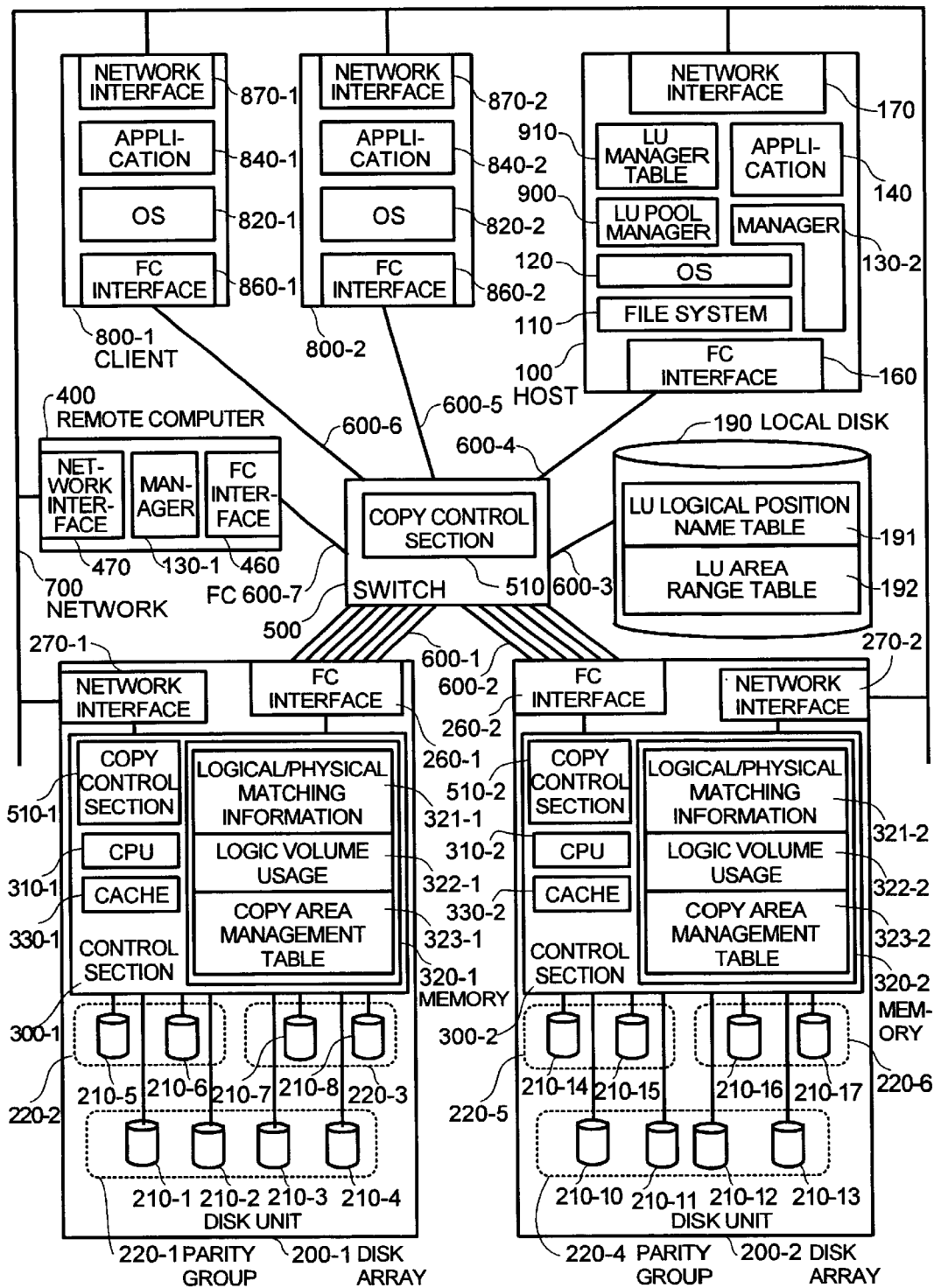
FIG. 28 is a diagram illustrating the configuration of a computer system of a fourth embodiment of the invention.

FIG. 28 illustrates the configuration of a computer system to which the fourth embodiment of the invention is applied.

As illustrated in FIG. 28, the computer system in this embodiment has a configuration in which the computer system in the first embodiment illustrated in FIG. 1 has in its host 100 an LU pool manager 900 and an LU management table 910.

This configuration facilitates the selection of the relocation destination for LUs. This embodiment will be described below.

An example of the LU management table 910 is illustrated in FIG. 29.

Herein, the LU number 3310 is a reference number allocated uniquely to each LU for use by the LU pool manager 900 for the management of LUs. The size 3320 represents the capacity of the pertinent LU. The configuration 3330 indicates the type of RAID configuration or, where the LU is composed of a cache 330 or an independent disk, indicates that configuration.

The state 3340 indicates the state of the LU, which can be one of the following types: "on line", "off line", "unmounted" and "in trouble off line". "On line" is a state in which the LU is normal, indicating accessibility from the host 100. "Off line" refers to an unoccupied LU, i.e. a state in which an LU is normally present but inaccessible from the host 100. "Unmounted" means that this LU is undefined and therefore inaccessible from the host 100. "In trouble off line" means that the LU is in trouble and inaccessible from the host 100.

The disk array number 3350 indicates a disk array 200 in which LU(s) is/are present.

The path 3360 is a reference number indicating which of the FCs 600, a plurality of which is connected to each disk array 200, the pertinent LU is allocated. The ID 3370 and the LUN 3380 are reference numbers identifying an LU.

The disk performance 3390 is an indicator of the performance of the disk unit 210 in which the pertinent LU is currently arranged. In FIG. 29, it is classified into high, medium and low by the average seek time and the average rotation awaiting time of the disk unit 210 and according to the configuration, and LUs on a cache are further classified to be of ultra-high performance.

The emulation type 3400 is the form of each LU provided by a disk array 200 to the host 100 as a disk unit.

The relocatability flag 3410 is a flag with which it is possible to designate, in relocating an LU, whether the relocation destination of the LU is usable as such. The user can use this flag 3410 to distinguish LUs to be relocated from other LUs, and also can change the on/off state of this flag 3410.

Whereas FIG. 29 includes an LU management table 910 for the disk array number 0, the manager 130 holds an LU management table 910 for every disk array 200.

Relocation is determined in this embodiment in the following manner.

First the user designates to the manager 130 the relocation origin LU and specifies requirements of a relocation destination LU. Specific requirements include performance conditions and the level of reliability.

For instance, where the relocation origin LU is excessively bearing a load beyond its hardware capacity, if a relocation destination of a higher performance is designated, the relocation will increase the processing capacity of the pertinent LU, and the performance of the computer system can be expected to improve.

Or, where an LU storing important data is present on an independent disk or a non-redundant RAID (RAID0), if a RAID5 or a RAID1 is designated as the relocation destination, resistance to trouble provided by redundancy can be secured.

After that, the manager 130, using information registered in the LU management table 910, determines the relocation destination for the LU and, after notifying the user, relocates the LU.

Figure 30:
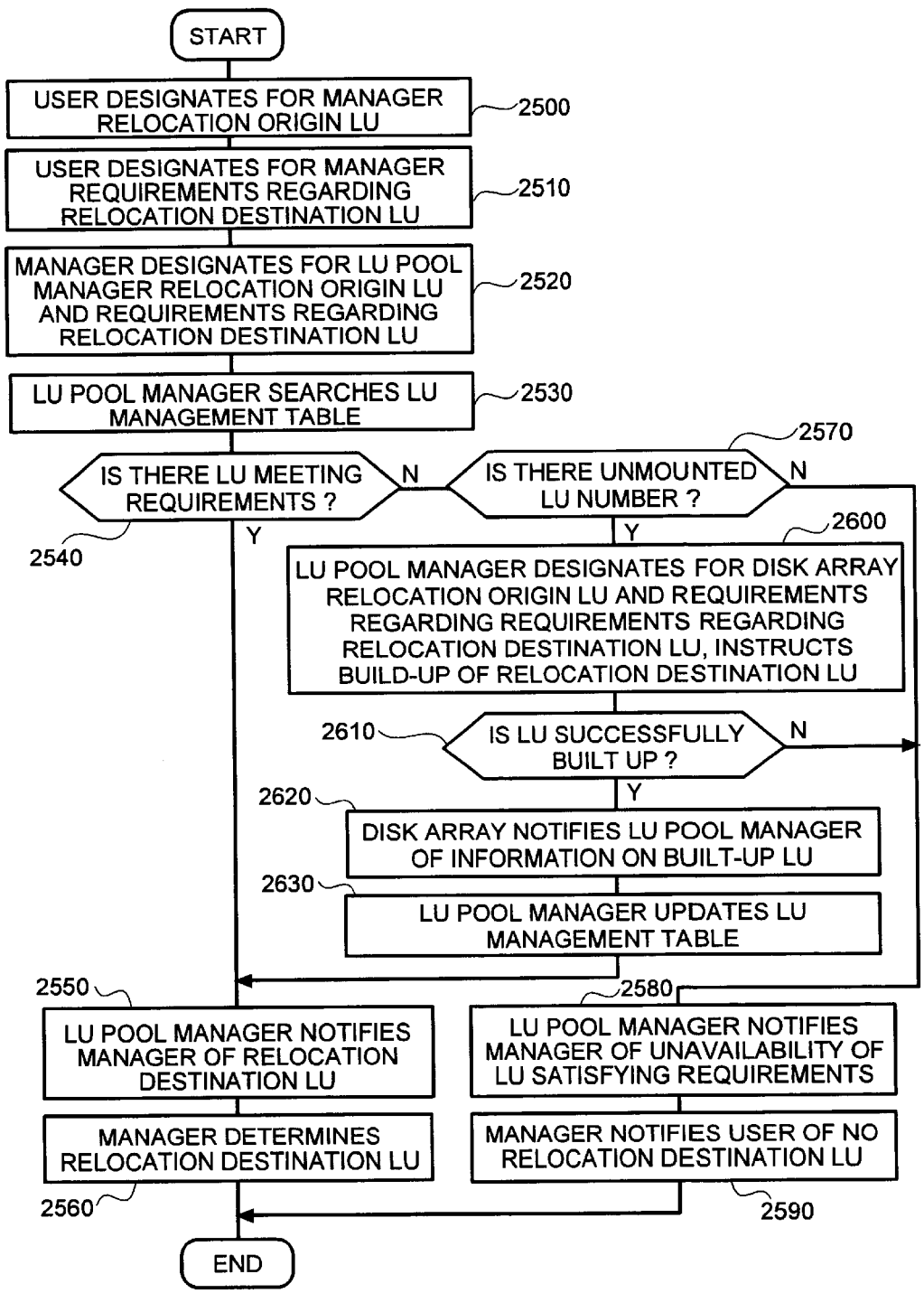
FIG. 30 is a flow chart showing the procedure of relocation object determination processing in the fourth embodiment of the invention.

Specific steps of relocation object determination processing in this embodiment will be described with reference to FIG. 30. First, the user designates to the manager 130 the disk array number 3350 of the relocation origin LU, path 3360, ID 3370 and LUN 3380 (2500). In this case the disk array number 3350 and LU number 3310 may as well be designated in place of the bus 3360, ID 3370 and so forth.

Next, the user designates, for example, inputting information via Graphical User Interface (GUI), to the manager 130 performance conditions and the level of reliability as requirements of the relocation destination (2510).

The manager 130 notifies the LU pool manager 900 of the aforementioned requirements concerning the relocation origin LU and the relocation destination (2520). The LU pool manager 900, searching the LU management table 910, checks if there is an LU satisfying the requirements (2530).

In this case, the conditions of search should be "the state is off line", "the size is not smaller than the relocation origin LU", "the emulation type is the same as the relocation origin LU", "the relocatability flag is on (yes), i.e. relocation is possible", "the performance conditions meet the requirements" and "the level of reliability satisfies the requirement".

If an LU satisfying the above-stated requirements is found at step 2540, the LU pool manager notifies the manager 130 of the LU (2550), and the manager 130 determines this LU to be the relocation destination LU (2560).

If no LU satisfying the requirements is found at step 2540, the LU pool manager 900 searches the LU management table to find an LU number 3310 whose "state is unmounted" (2570).

If no unmounted LU number 3310 is found to exist, the LU pool manager 900 notifies the manager 130 of the unavailability of an LU satisfying the requirements (2580), the manager 130 so notified, notifies the user that there is no relocation destination LU available(2590).

If an unmounted LU is found at step 2570, the LU pool manager 900 designates requirements for the unmounted LU number 3310 and the relocation destination LU, and instructs a satisfying disk array 200 to build up a relocation destination LU (2600).

The requirements for the relocation destination LU in this case include: "the size is not smaller than the relocation origin LU", "the emulation type is the same as the relocation origin LU", "the performance conditions meet the requirements" and "the level of reliability satisfies the requirement".

The disk array 200 so instructed performs LU build-up processing (2610) and, if it succeeds in building up one, notifies the LU pool manager 900 of the above-cited items of information including the disk array number 3350, bus 3360, ID 3370 and LUN 3380 regarding the built-up LU (2620) or, if it fails to build up one, notifies the LU pool manager 900 of the impossibility to build up the required LU (2610).

The LU pool manager 900 registers into the LU management table 910 information on the LU which was notified of (2630), and notifies the manager 130 (2550). The manager 130 determines this LU to be the relocation destination LU (2560).

The LU pool manager 900 notified of the inability to build up the required LU notifies the manager 130 of the unavailability of an LU satisfying the requirements (2580), the manager 130 so notified notifies the user of the unavailability of any relocation destination LU (2590).

Figure 31:
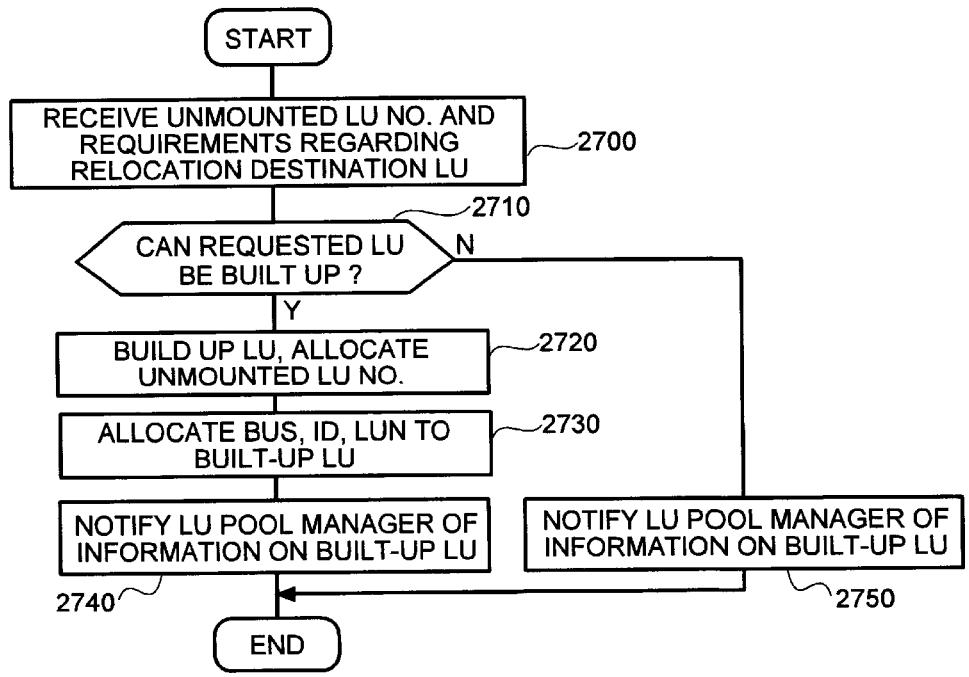
FIG. 31 is a flow chart showing the procedure of build-up processing in the fourth embodiment of the invention.

Here will be described LU build-up processing performed by a disk array 200 with reference to FIG. 31 of an embodiment of the present invention.

The disk array 200, instructed as described above, receives requirements concerning the unmounted LU number 3310 and the relocation destination LU (2700).

Next, the disk array 200 judges from the state of allocation of internal resources and other factors in the disk unit 210 and the cache 330 whether or not an LU satisfying the above-stated requirements can be built up (2710). If one can be, the disk array 200 builds up the LU by allocating internal resources and carrying out formatting/initialization processing, and allocates a designated unmounted LU number 3310 (2720).

Further the disk array 200 sets the FC interface 260 to allocate the path 3360, ID 3370 and LUN 3380 to the aforementioned LU (2730). Next the disk array 200 notifies the LU pool manager 900 the aforementioned items of information regarding the built-up LU including the disk array number 3350, path 3360, ID 3370 and LUN 3380 (2740).

If a build up of an LU cannot be done at step 2710, the LU pool manager 900 is notified of the inability to build up an LU (2750).

The manager 130 having determined the relocation destination LU as described above, performs relocation processing with respect to the relocation origin LU and the relocation destination LU as in the first embodiment.

Figure 32:
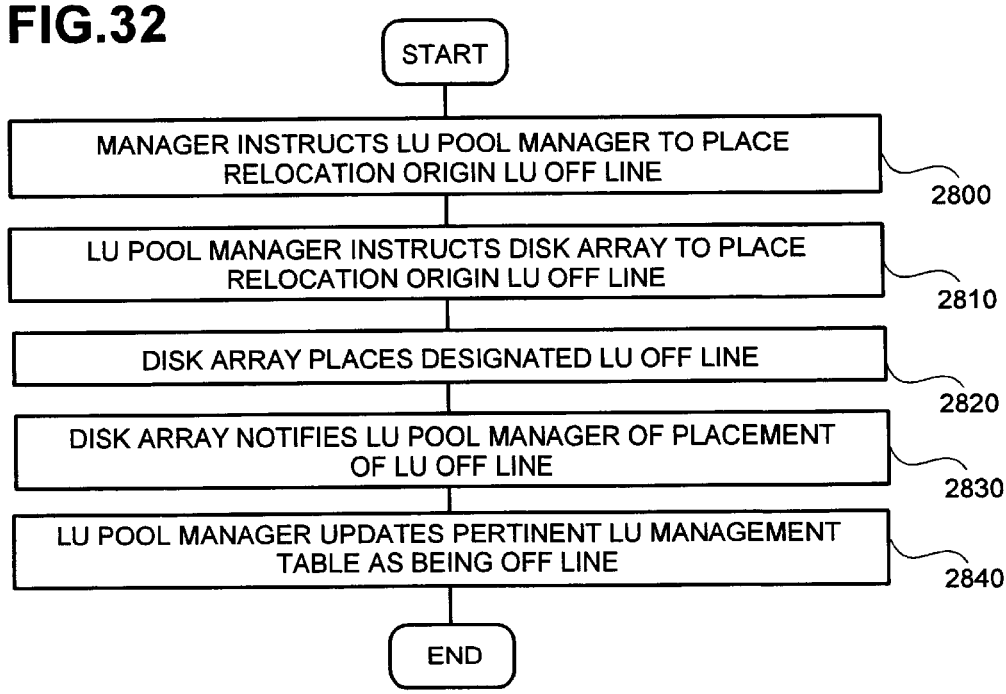
FIG. 32 is a flow chart showing the procedure of processing to the relocation origin LU off line in the fourth embodiment of the invention.

Next will be described processing to place the relocation origin LU off line with reference to FIG. 32 of an embodiment of the present invention.

The manager 130 acquires the state of copying progress by the method described with reference to the first embodiment and, if the copying is completed, instructs the LU pool manager 900 to place the relocation origin LU off line (2800).

The LU pool manager 900 so instructed instructs the disk array 200 of the relocation origin LU to place the relocation origin LU off line (2810). The disk array 200 so instructs sets the FC interface 260 and places the aforementioned LU off line (2820). The disk array 200 notifies the LU pool manager 900 of the placement of the LU off line (2830).

The LU pool manager so notified updates the state 3340 of the pertinent in the LU management table to an off-line state (2840).

Although a case in which the manager 130 acquires information on the progress of copying here, it is also possible for the disk array 200 to notify the manager 130 of the completion of copying.

Or, instead of having the manager 130 instruct the placement of the LU off line, the disk array 200 may place the relocation origin LU off line upon completion of copying, and notify the LU pool manager 900 of the placement of the LU off line.

Other embodiments accomplish instructions and notifications between the LU pool manager 900 and the disk arrays 200 described with respect to this embodiment according to the SCSI, SNMP or some other protocol or command system via the FC 600 or the network 700.

Also, although information on the requirements for a relocation destination LU and the like are supposed to be designated by the user in this embodiment, in an alternative embodiment the manager 130 may automatically make the judgment and assign the designation accordingly.

Further, while the LU pool manager 900 and the manager 130 are supposed to be present on the host 100 in this embodiment, in another embodiment the LU pool manager may as well be present on some other computer then the manager 130, such as a remote computer 400.

In this case, the LU pool manager 900 and the manager 130 accomplish instructions and notifications according to the SCSI, SNMP or some other protocol or command system via the FC 600 or the network 700.

Also, although it is supposed in this embodiment for LU management to be carried out by the LU pool manager 900 and processing regarding relocation to be accomplished by the manager 130, in another embodiment the manager 130 may perform both types of processing.

This embodiment, in processing LU relocation, can facilitate the management and selection of the relocation destination LU to reduce the burden on the user, and thereby make the management of the computer system easier.

Next will be described a fifth embodiment of the present invention.

Figure 33:
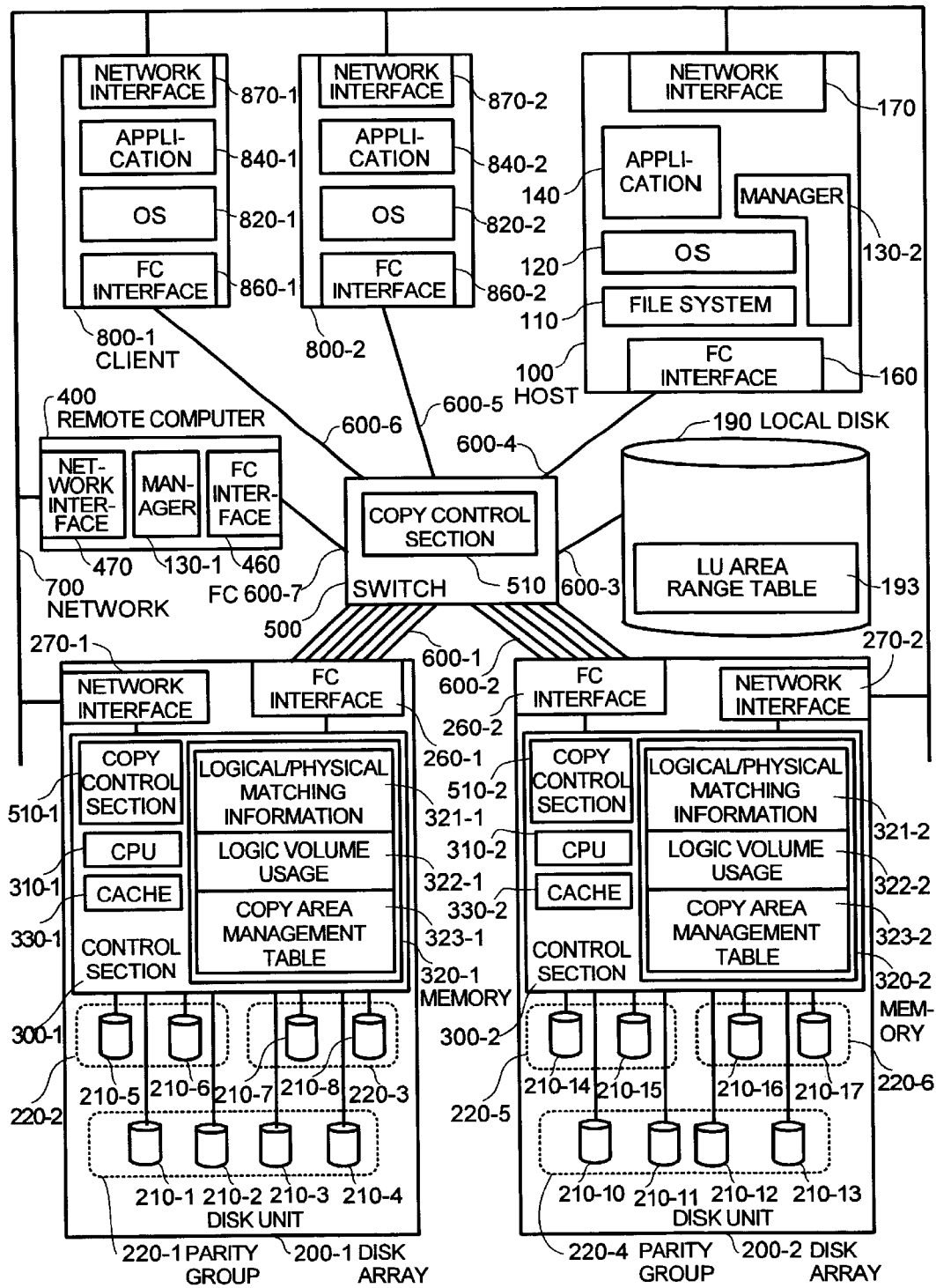
FIG. 33 is a diagram illustrating the configuration of a computer system of a fifth embodiment of the invention.

As illustrated in FIG. 33, the computer system in this fifth embodiment has a configuration in which the computer system in the third embodiment illustrated in FIG. 25 uses, to include, a LU area range table 195, which is created by adding new items to the LU area range table 192, to let the host 100 read from or write into a file in compliance with a read/write request from a client 800, and process data transfers to or from the client 800 via the network 700.

As such file sharing protocols via the network 700, the NFS (Network File System) and CIFS (Common Internet File System) are extensively used, and the use of any such protocol and the extensively disseminated network 700 makes possible ready realization of a file sharing environment. In this embodiment as well, the use of the NFS or the CIFS is implemented. In an embodiment files on the host or server or disk arrays, appear as if they are on the client. Hence the client has transparent access to storage on a network 700 using, for example, a TCP/IP or an IPX, network protocols.

Figures 34, 37:
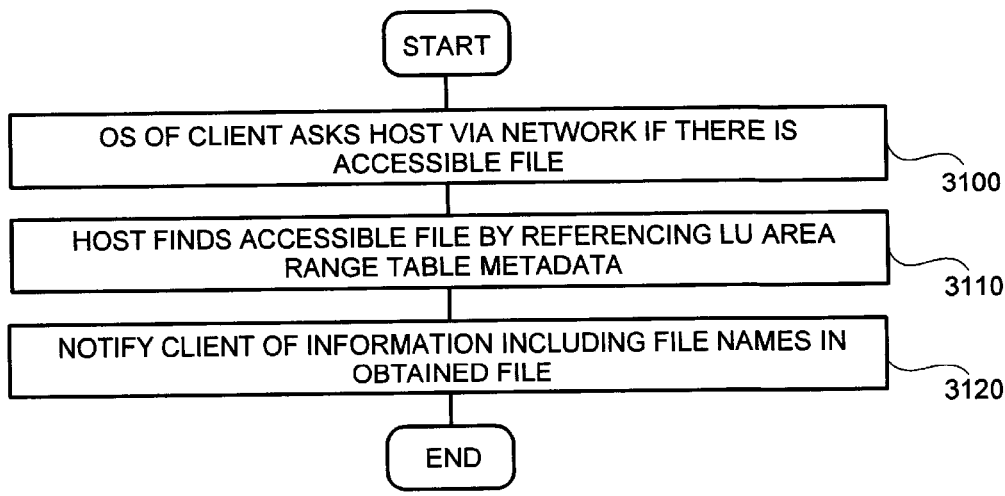
FIG. 34 shows an LU area range table in the fifth embodiment of the invention.
FIG. 37 is a flowchart showing the procedure of processing to reply on accessible files in the fifth embodiment of the invention.

The LU area range table 193 in this embodiment is illustrated in FIG. 34.

In FIG. 34, the type of use 3510 refers to distinction between an area read/write from or to which is accomplished via the FC 600 as in the third embodiment and an area it is carried out via the network 700 as will be described with reference to this embodiment.

This type of use 3510 can also include distinction between an area for use in the configuration and method for LU relocation as in the first embodiment (a read/write request in this case is made via the FC 600) and an area read/write from or to which is accomplished via the network 700. It may further include information on unused areas.

Description of the other items including the intra-area address, disk array number, ID, LUN and intra-LU address is dispensed with, because they are the same as their respective counterparts in the description of the third embodiment.

Collective management of LUs using this LU area range table 193 enables the file system 110 to manage the LUs as a plurality of areas differentiated at least by the type of use.

By setting the LU area range table 193 as described above, the host 100 can distinguish a request from a client 800 whether it is for access by the method described with reference to the third embodiment or for access by the above-described method, i.e. access via the network 700, according to the protocol or the like the request uses, and handles areas consisting of LUs according to this type of use 3510.

Thus, as the host 100 processes the third embodiment and files and areas accessed in this embodiment as distinguished between each other, there is no conflict which would otherwise result from the coexistence of different methods of access to the same file or area.

Further, as the host 100 applies similar distinction in search for an accessible file, if for instance there is a request for access from a client 800 to files in the same disk array, e.g., 200-1, the host 100 distinguishes the type of use 3510 of the file requested by the client 800 and does not notify the client 800 of files of any other type of use 3510 than the type of use 3510 of the file requested by the client 800, which accordingly is notified only of a file accessible by its own method of access. Therefore in this system, shared files can be readily managed.

Moreover, by also distinguishing areas used in the configuration and method of LU relocation as in the first embodiment (read/write is via the FC 600) and areas read/write from or to, whose LUs is accomplished via the host 100 and the network 700, the above-described advantages can be achieved for all these types of use. Also, the user can freely set the LU area range table 193 from the host 100 or the remote computer 400.

In addition, although in the foregoing description a file-sharing protocol such as the NFS or the CIFS is supposed to be used via the network 700 and data are to be transferred between the host 100 and the clients 800 via the network 700, in an alternative embodiment, the process may be done via the FC 800 instead of the network 700.

In yet another embodiment, the read/write requests the clients 800 make may be processed for LUs via the host 100 and the network 700 as in the above-described processing.

In this processing, the host 100, as in the searching of file storage areas in the above-described processing, the area from or to which read/write is requested by a client 800 is located by using the LU area range table 192, data is read and transferred to the client 800 via the network 700, or data is received from the client 800 via the network 700 and written.

Figure 35:
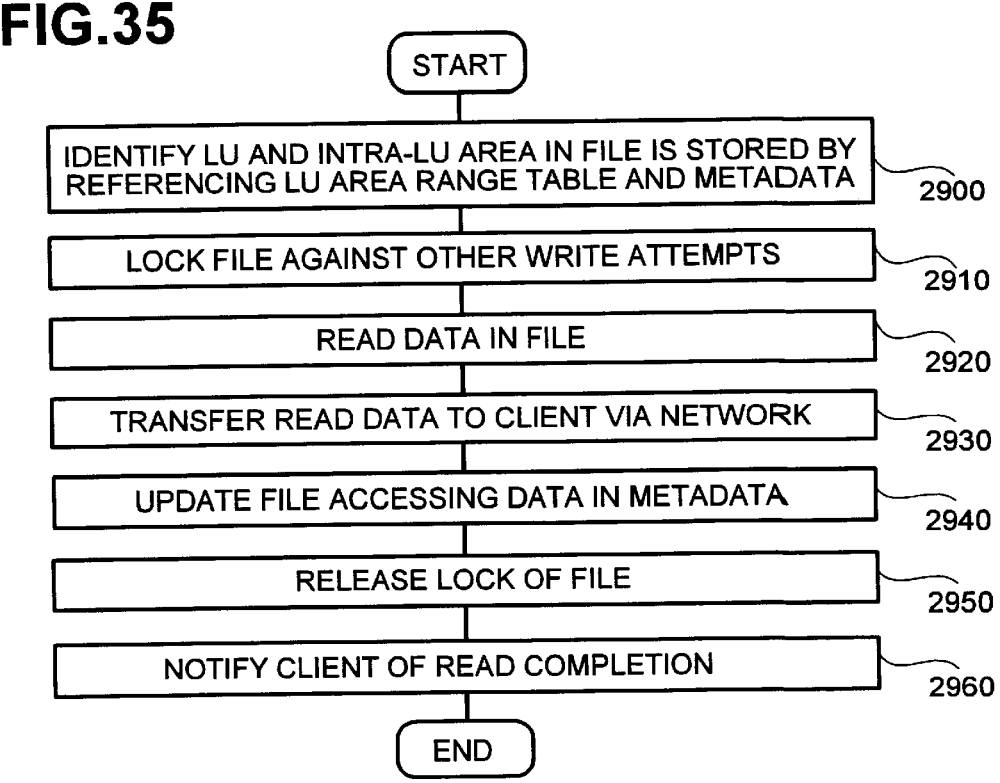
FIG. 35 is a flow chart showing the procedure of processing by the application of a client to read from a file in the fifth embodiment of the invention.

Processing by the host 100 when the application 840 of a client 800 reads from a file stored in a disk array 200 will now be described with reference to FIG. 35 of an embodiment of the present invention.

As in the third embodiment, the file system 110 of the host 100 having received a read notification locates the LU and the intra-LU area in which the pertinent file is stored by referencing the LU area range table 193 and the metadata (2900), locks the file against other write requests (2910), reads data in the file (2920), transfers the read contents to the client 800 via the network 700 (2930), updates the date of accessing the file on the metadata (2940), releases the lock (2950), and notifies the client 800 of the completion of read (2960).

Figure 36:
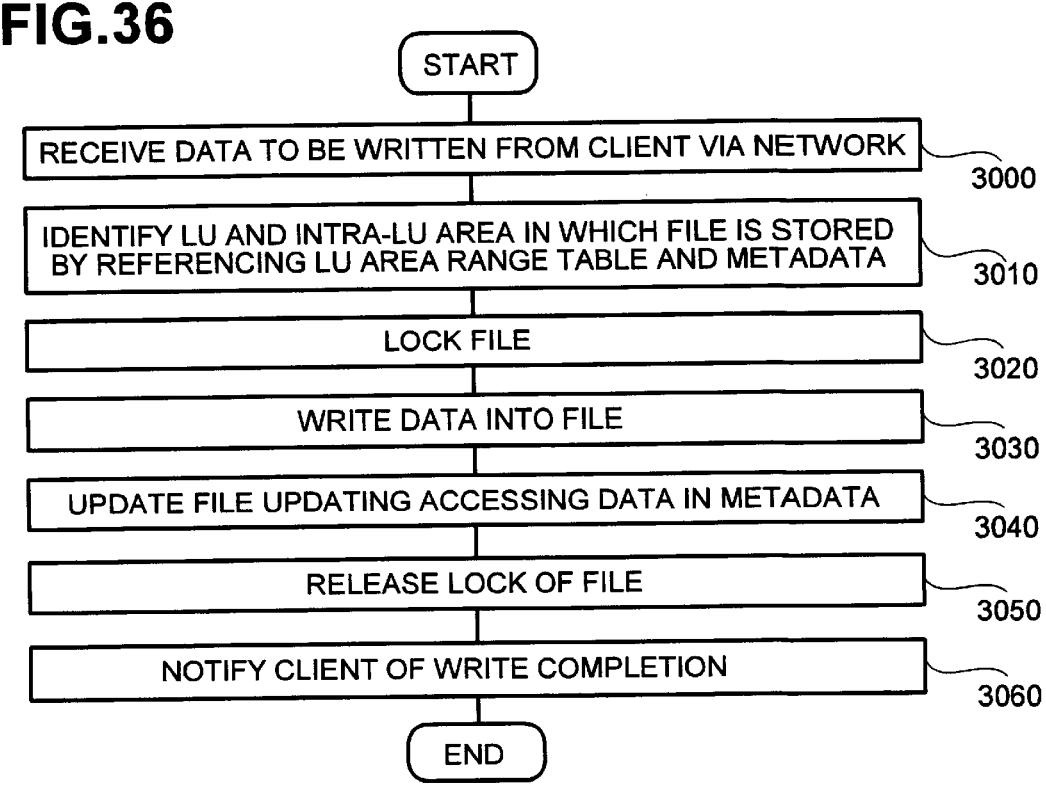
FIG. 36 is a flowchart showing the procedure of processing by the application of a client to write into a file in the fifth embodiment of the invention.

Processing by the host 100 when the application 840 writes into a file stored in a disk array 200 will now be described with reference to FIG. 36 of an embodiment of the present invention.

The host 100 having received a write notification receives data to be written from the client 800 via the network 700 (3000), locates the LU and the intra-LU area in which the pertinent file is stored by referencing the LU area range table 192 and the metadata (3010), locks the file (3020), and writes the aforementioned data into the file (3030). On this occasion, if necessary, it updates the metadata to add areas in which files are used.

After that, the host updates the data of file updating and that of access on the metadata (3040), releases the aforementioned lock (3050), and notifies the client 800 of the completion of write (3060).

Next will be described, with reference to FIG. 37, processing that takes when the application 840 or the OS 820 of a client 800 makes an inquiry about the presence of any accessible file of an embodiment of the present invention.

At the request of the application 840 or the OS 820, the OS 820 inquires of the host 100 via the network 700 about the presence of any accessible file (3100).

The file system 110 of the host 100 so notified locates any such file by referencing the LU area range table 193 and the metadata (3110), and notifies the client 800 of the file name and other information on each such file (3120).

Processing as described above enables the clients 800 and the host 100 to use files stored in the disk arrays 200 in a shared manner via the host 100. The method of relocation and other manners of processing are the same as their respective counterparts in the third embodiment.

Relocation processing is supposed to be accomplished in an area of each type of use. This makes possible, even in an environment in which data stored in the disk arrays 200 are used in a shared manner, that the physical relocation of files can be accomplished among a plurality of disk arrays 200 without intervention by the host application 140 or the client application 840.

Although the above functionality has generally been described in terms of specific hardware and software, it would be recognized that the invention has a much broader range of applicability. For example, the software functionality can be further combined or even separated. Similarly, the hardware functionality can be further combined, or even separated. The software functionality can be implemented in terms of hardware or a combination of hardware and software. Similarly, the hardware functionality can be implemented in software or a combination of hardware and software. Any number of different combinations can occur depending upon the application.

Many modifications and variations of the present invention are possible in light of the above teachings. Therefore, it is to be understood that within the scope of the appended claims, the invention may be practiced otherwise than as specifically described.

What is claimed is:

1. A computer system comprising:

a computer including an application, a file system, and a manager;

a plurality of storage systems each including at least one logical storage area, usage information of the at least one logical storage area, and a control unit coupled with the at least one logical storage area;

a storage device to be accessed by the computer, the storage device configured to store correlation information between a first ID used by the application for accessing target data and a second ID designating a logical storage area storing the target data; and a network coupled with the computer and the storage systems;

wherein the file system of the computer is configured to receive an access request including a first ID from the application, to acquire a second ID corresponding to the received first ID by referring to the correlation information stored in the storage device, and to issue an access command including the acquired second ID to one of the storage systems which includes a logical storage area designated by the acquired second ID;

wherein the storage system which receives the access command from the file system of the computer is configured to access the logical storage area designated by the acquired second ID and to update usage information of the logical storage area of the storage system according to the access command; and wherein the manager of the computer is configured to acquire usage information from each of the plurality of storage systems, to issue a data reallocation command for copying data stored in a source logical storage area in a source storage system of the plurality of storage systems to a target logical storage area in a target storage system of the plurality of storage systems according to the acquired usage information, and to update the correlation information in the storage device according to the data reallocation.

2. The computer system of claim 1 wherein the usage information includes one of occupation duration of logical storage areas and occupation rate of logical storage areas.

3. The computer system of claim 1 wherein the control unit of the target storage system is configured, when the data reallocation command is received, to copy data stored in the source logical storage area in the source logical storage system to the target logical storage area in the target storage system according to the received data reallocation command.

4. The computer system of claim 1 wherein the manager is configured, prior to issuing the data reallocation command, to instruct the file system to lock the source logical storage area of the source logical storage system, to suspend acceptance of read/write requests to the source logical storage area, to flush a cache with respect to the source logical storage area, and to write into the source logical storage area any data which is cached in a memory of the computer and which has not yet been written into the source logical storage area.

5. The computer system of claim 1 wherein the manager is configured, after updating the correlation information in the storage device, to unlock the source logical storage area of the source logical storage system, to update information by re-reading the updated correlation information, and to permit acceptance of read/wrist requests to the source logical storage area.

6. The computer system of claim 1 wherein the manager is configured to issue the data reallocation command for load distribution among the plurality of storage systems.

7. The computer system of claim 1 wherein the network comprises a Fibre channel network.

8. The computer system of claim 1 wherein the storage systems comprise disk array systems each for providing the computer with at least one logical unit.

9. The computer system of claim 1 wherein the usage information comprises parity group usage information.

10. A computer system comprising:
a computer including an application, a file system, and a manager;
a plurality of storage systems each including at least one logical storage area, usage information of the at least one logical storage area, meta data to be accessed by the file system, and a control unit coupled with the at least one logical storage area, the meta data including correlation information between a file ID used by the application and a first ID designating a logical location storing file data;
a storage device to be accessed by the computer, the storage device configured to store correlation information between the first ID and a second ID designating a logical storage area storing the file data; and
a switch coupled with the computer and the storage systems;
wherein the file system of the computer is configured to receive an access request including a file ID from the application, to acquire a second ID corresponding to the received file ID by referring to a meta data and the storage device, and to issue an access command including the acquired second ID to one of the storage systems which includes a logical storage area designated by the acquired second ID;
wherein the storage system which receives the access command from the file system of the computer is configured to access file data stored in a logical storage area designated by the acquired second ID included in the received access command, and to update usage information of the logical storage area of the storage system according to the access command; and
wherein the manager of the computer is configured to acquire usage information from each of the plurality of storage systems, to issue to the switch a data reallocation command for copying file data stored in a source logical storage area in a source storage system of the plurality of storage systems to a target logical storage area in a target storage system of the plurality of storage systems according to the acquired usage information, and to update the meta data according to the data reallocation.

11. The computer system of claim 10 wherein the usage information includes one of occupation duration of logical storage areas and occupation rate of logical storage areas.

12. The computer system of claim 10 wherein the switch is configured to receive the data reallocation command, and to copy file data stored in the source logical storage area in the source logical storage system to the target logical storage area in the target storage system according to the received data reallocation command.

13. The computer system of claim 10 wherein the manager is configured to issue the data reallocation command for load distribution among the plurality of storage systems according to the acquired usage information.

14. The computer system of claim 10 wherein the control unit of the target storage system is configured, when the data reallocation command is received, to copy data stored in the source logical storage area in the source logical storage system to the target logical storage area of the target storage system according to the received data reallocation command.

15. The computer system of claim 10 wherein the switch comprises a Fibre channel switch.

16. The computer system of claim 10 wherein the storage systems comprise disk array systems each for providing the computer with at least one logical unit.

17. The computer system of claim 10 wherein the usage information comprises parity group usage information.

18. A method for data reallocation among a plurality of storage systems by a computer, the storage systems each including at least one logical storage area, usage information of the at least one logical storage area, and a control unit coupled with the at least one logical storage area, the method comprising:
receiving an access request including a first ID;
accessing a storage device, which stores correlation information between a first ID for accessing target data and a second ID designating a logical storage area storing the target data, to acquire a second ID corresponding to the received first ID;
issuing an access command including the acquired second ID to one of the storage systems which includes a logical storage area designated by the acquired second ID, wherein the storage system which receives the access command is configured to access the logical storage area designated by the acquired second ID and to update usage information of the logical storage area of the storage system according to the access command;

acquiring usage information from each of the plurality of storage systems;

issuing a data reallocation command for copying data stored in a source logical storage area in a source storage system of the plurality of storage systems to a target logical storage area in a target storage system of the plurality of storage systems according to the acquired usage information; and updating the correlation information in the storage device according to the data reallocation.

19. The method of claim 18 wherein the usage information includes one of occupation duration of logical storage areas and occupation rate of logical storage areas.

20. The method of claim 18 wherein the control unit of the target storage system is configured, when the data reallocation command is received, to copy data stored in the source logical storage area in the source logical storage system to the target logical storage area of the target storage system according tote received data reallocation command.

21. The method of claim 18 further comprising, prior to issuing the data reallocation command:
locking the source logical storage area of the source logical storage system;
suspending acceptance of read/write requests to the source logical storage area;
flushing a cache with respect to the source logical storage area; and
writing into the source logical storage area any data which is cached in a memory of the computer and which has not yet been written into the source logical storage area.

22. The method of claim 18 further comprising, after updating the correlation information in the storage device:
unlocking the source logical storage area of the source logical storage system;
updating information by re-reading the updated correlation information; and
permitting acceptance of read/wrist requests to the source logical storage area.

23. The method of claim 18 wherein the data reallocation command is issued for load distribution among the plurality of storage systems.

24. The method of claim 18 further comprising coupling the computer with the storage systems by a network.

25. The method of claim 24 wherein the network comprises a Fibre channel network.

26. The method of claim 18 wherein the storage systems comprise disk array systems each for providing the computer with a east one logical unit.

27. The method of claim 18 wherein the usage information comprises parity group usage information.

28. A method for data reallocation among a plurality of storage systems by a computer, the storage systems each including at least one logical storage area, usage information of the at least one logical storage area, meta data including correlation information between a file ID and a first ID designating a logical location storing file data, and a control unit coupled with the at least one logical storage area, the method comprising:
receiving an access request including a file ID;
accessing a storage device which stores correlation information between a first ID for accessing target data and a second ID designating a logical storage area storing the target data;
acquiring a second ID corresponding to the received file ID by referring to a meta data and the storage device;
issuing an access command including the acquired second ID to one of the storage systems which includes a logical storage area designated by the acquired second ID, wherein the storage system which receives the access command is configured to access file data stored in a logical storage area designated by the acquired second ID and to update usage information of the logical storage area of the storage system according to the access command;
acquiring usage information from each of the plurality of storage systems;
issuing a data reallocation command for copying data stored in a source logical storage area in a source storage system of the plurality of storage systems to a target logical storage area in a target storage system of the plurality of storage systems according to the acquired usage information; and
updating the meta data according to the data reallocation.

29. The method of claim 28 wherein the usage information includes one of occupation duration of logical storage areas a occupation rate of logical storage areas.

30. The method of claim 28 wherein the control unit of the target storage system is configured, when the data reallocation command is received, to copy data stored in the source logical storage area in the source logical storage system to the target logical storage area of the target storage system according to the received data reallocation command.

31. The method of claim 28 the data reallocation command is issued for load distribution among the plurality of storage systems.

32. The method of claim 28 further comprising coupling the computer and the storage systems with a switch.

33. The method of claim 32 wherein the switch comprises a Fibre channel switch.

34. The method of claim 32 wherein the switch is configured to receive the data reallocation command, and to copy file data stored in the source logical storage area in the source logical storage system to the target logical storage area in the target storage system according to the received data reallocation command.

35. The method of claim 28 wherein the storage systems comprise disk array systems each for providing the computer with at east one logical unit.

36. The method of claim 28 wherein the usage information comprises parity group usage information.

37. A computer program product stored on a computer readable medium for data reallocation among a plurality of storage systems by a computer, the storage systems each including at least one logical storage area, usage information of the at least one logical storage area, and a control unit coupled with the at least one logical storage area, the computer program product comprising:
code for receiving an access request including a first ID;
code for accessing a storage device, which stores correlation information between a first ID for accessing target data and a second ID designating a logical storage area storing the target data, to acquire a second ID corresponding to the received first ID;
code for issuing an access command including the acquired second ID to one of the storage systems which includes a logical storage area designated by the acquired second ID, wherein the storage system which receives the access command is configured to access the logical storage area designated by the acquired second ID and to update usage information of the logical storage area of the storage system according to the access command;

code for acquiring usage information from each of the plurality of storage systems;

code for issuing a data reallocation command for copying data stored in a source logical storage area in a source storage system of the plurality of storage systems to a target logical storage area in a target storage system of the plurality of storage systems according to the acquired usage information; and code for updating the correlation information in the storage device according to the data reallocation.

38. The computer program product of claim 37 wherein the usage information includes one of occupation duration of logical storage areas and occupation rate of logical storage areas.

39. The computer program product of claim 37 further comprising, prior to issuing the data reallocation command:

code for locking the source logical storage area of the source logical storage system;

code for suspending acceptance of read/write requests to the source logical storage area;

code for flushing a cache with respect to the source logical storage area; and code for writing into the source logical storage area any data which is cached in a memory of the computer and which has not yet been written into the source logical storage area.

40. The computer program product of claim 37 further comprising, after updating the correlation information in the storage device:

code for unlocking the source logical storage area of the source logical storage system;

code for updating information by re-reading the updated correlation information; and code for permitting acceptance of read/wrist requests to the source logical storage area.

41. A computer program product stored on a computer readable medium for data reallocation among a plurality of storage systems by a computer, the storage systems each including at least one logical storage area, usage information of the at least one logical storage area, meta data including correlation information between a file ID and a first ID designating a logical location storing file data, and a control unit coupled with the at least one logical storage area, the method comprising:

code for receiving an access request including a file ID;

code for accessing a storage device which stores correlation information between a first ID for accessing target data and a second ID designating a logical storage area storing the target data;

code for acquiring a second ID corresponding to the received file ID by referring to a meta data and the storage device;

code for issuing an access command including the acquired second ID to one of the storage systems which includes a logical storage area designated by the acquired second ID, wherein the storage system which receives the access command is configured to access file data stored in a logical storage area designated by the acquired second ID and to update usage information of the logical storage area of the storage system according to the access command;

code for acquiring usage information from each of the plurality of storage systems;

code for issuing a data reallocation command for copying data stored in a source logical storage area in a source storage system of the plurality of storage systems to a target logical storage area in a target storage system of the plurality of storage systems according to the acquired usage information; and code for updating the meta data according to the data reallcation.

42. The computer program product of claim 41 wherein the usage information includes one of occupation duration of logical storage areas and occupation rate of logical storage areas.

* * * * *